United States Patent
Stefanoski et al.

(10) Patent No.: US 8,502,815 B2
(45) Date of Patent: Aug. 6, 2013

(54) SCALABLE COMPRESSION OF TIME-CONSISTENT 3D MESH SEQUENCES

(75) Inventors: Nikolce Stefanoski, Hannover (DE); Jörn Ostermann, Hannover (DE); Patrick Klie, Hannover (DE)

(73) Assignee: Gottfried Wilhelm Leibniz Universitat Hannover, Hannover (DE)

( * ) Notice: Subject to any disclaimer, the term of this patent is extended or adjusted under 35 U.S.C. 154(b) by 648 days.

(21) Appl. No.: 12/596,653

(22) PCT Filed: Apr. 18, 2008

(86) PCT No.: PCT/EP2008/054776
§ 371 (c)(1),
(2), (4) Date: Mar. 29, 2010

(87) PCT Pub. No.: WO2008/129021
PCT Pub. Date: Oct. 30, 2008

(65) Prior Publication Data
US 2012/0262444 A1  Oct. 18, 2012

Related U.S. Application Data

(60) Provisional application No. 60/912,443, filed on Apr. 18, 2007.

(51) Int. Cl.
*G06T 15/00* (2011.01)
*G06T 17/00* (2006.01)
*G06K 9/36* (2006.01)

(52) U.S. Cl.
USPC .................... 345/419; 345/428; 382/238

(58) Field of Classification Search
None
See application file for complete search history.

(56) References Cited

PUBLICATIONS

Cohen-Or et. al., Progressive Compression of Arbitrary Triangular Meshes, IEEE Visualization 99 Conference Proc., pp. 67-72, 1999.*
Peng et. al., Technologies for 3D mesh compression: A Survey, J. Vis. Commun. Image R. 16 (2005) 688-733, Apr. 16, 2005.*
Balter et al., "Scalable and Efficient Video Coding Using 3-D Modeling," IEEE Transactions on Multimedia 8(6): 1147-1155, Dec. 2006.
Celasun et al., "Hierarchical Representation and Coding of 3D Mesh Geometry," in IEEE International Conference on Image Processing, IEEE, Oct. 1, 2006, pp. 1893-1896.
Müller et al., "Predictive Compression of Dynamic 3D Meshes," in IEEE International Conference on Image Processing, Genova, Italy, Sep. 11-14, 2005, pp. 621-624.
Payan et al., "Temporal wavelet-based compression for 3D animated models," Computers & Graphics 31(1): 77-88, Feb. 15, 2007.

(Continued)

*Primary Examiner* — Hau Nguyen
*Assistant Examiner* — Ryan M Gray
(74) *Attorney, Agent, or Firm* — Seed IP Law Group PLLC

(57) ABSTRACT

We present a method for predictive compression of time-consistent 3D mesh sequences supporting and exploiting scalability. The applied method decomposes each frame of a mesh sequence in layers, which provides a time-consistent multi-resolution representation. Following the predictive coding paradigm, local temporal and spatial dependencies between layers and frames are exploited for layer-wise compression. Prediction is performed vertex-wise from coarse to fine layers exploiting the motion of already encoded neighboring vertices for prediction of the current vertex location. Consequently, successive layer-wise decoding allows to reconstruct frames with increasing levels of detail.

11 Claims, 13 Drawing Sheets

PUBLICATIONS

Figure 1:
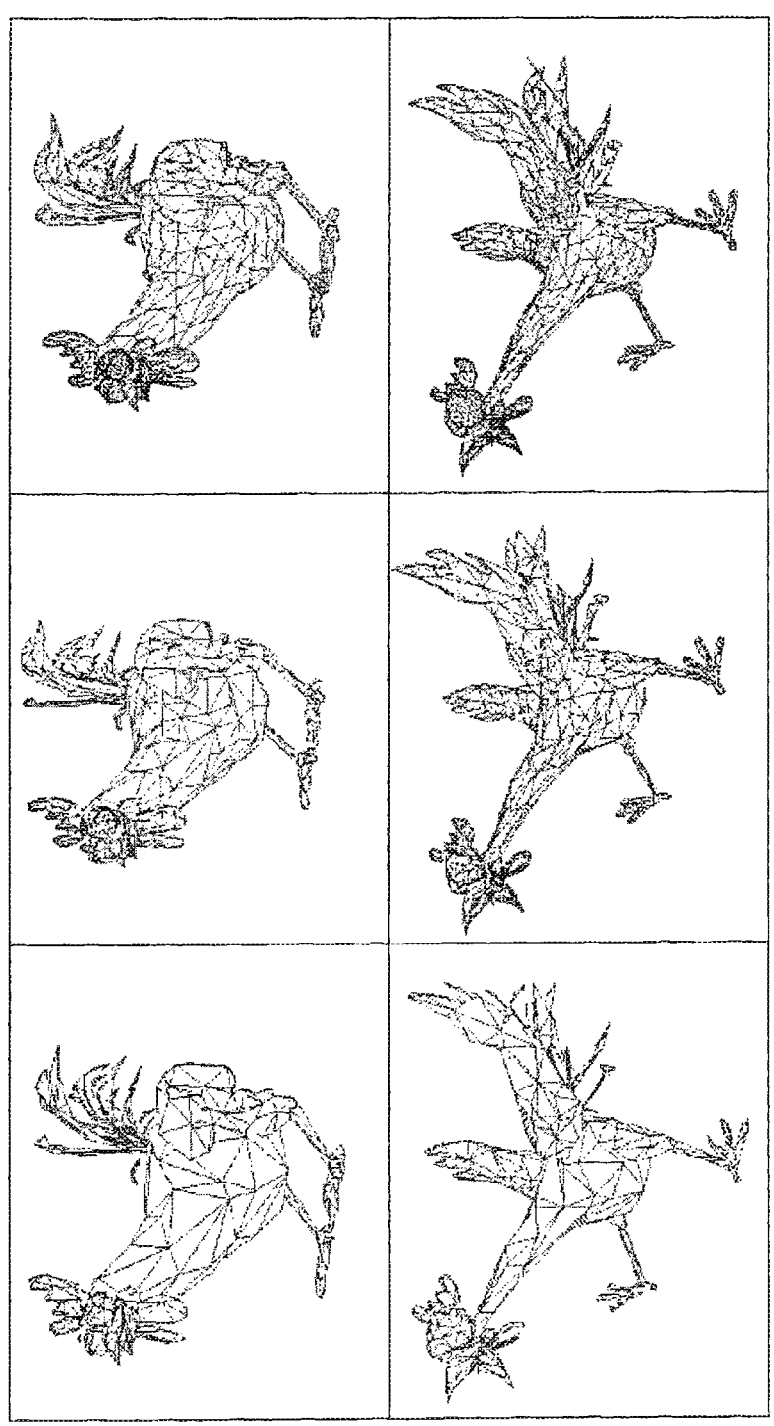

Stefanoski et al., "Scalable Compression of Dynamic 3D Meshes," International Organisation for Standardisation Coding of Moving Pictures and Audio, San Jose, US, Apr. 2007, 23 pages.

Stefanoski et al., "Scalable Linear Predictive Coding of Time-Consistent 3D Mesh Sequences," in IEEE 3DTV Conference, May 1, 2007, pp. 1-4.

Stefanoski et al., "Layered Predictive Coding of Time-Consistent Dynamic 3D Meshes Using a Non-Linear Predictor," in IEEE International Conference on Image Processing, Sep. 1, 2007, pp. V109-V112.

* cited by examiner

SCALABLE COMPRESSION OF TIME-CONSISTENT 3D MESH SEQUENCES

The present invention concerns a method for encoding a time-consistent sequence, in particular a 3D mesh sequence using scalable predictive coding. It also concerns an encoder for encoding a time-consistent sequence, in particular a 3D mesh sequence using scalable predictive coding. The present invention further concerns a method for decoding a data signal representing an encoded time-consistent sequence, in particular a 3D mesh sequence and it concerns a decoder for decoding a data signal representing an encoded time-consistent sequence in particular a 3D mesh sequence. The invention also concern a corresponding computer programs and a corresponding data signal.

INTRODUCTION

Multimedia hardware is getting evermore powerful and affordable. This development enables a permanent improvement of existing applications or even development of new applications based on time-varying 3D content, like 3D television, immersive tele-surgery, or immersive computer games. Efficient compression of time-varying 3D content gets crucial importance in this context.

Due to an increasingly broadening range of access networks, like the Internet or local area networks, mobile networks, etc., the bit rate of compressed time-varying 3D content has to be adapted to network transfer rates and end-user devices. To meet this requirement we developed a scalable compression scheme. This technique enables to encode 3D content once only, while decoding can be performed on different devices with a quality adapted to the capacity of the network and the end-user device. This is achieved by creating structured bit streams that allow layer-wise decoding and successive reconstruction of 3D content with increasing quality.

RELATED WORK

Several approaches for compression of time-consistent 3D mesh sequences have been presented recently. Karni and Gotsman, in "Compression of soft-body animation sequences," Computer & Graphics, Vol. 28, No. 1, 2004, and Sattler et al., in "Simple and efficient compression of animation sequences," in Proceedings of ACM/EG Symposium on Computer Animation, Los Angeles, Calif., USA, 2005, transform mesh sequences using principal component analysis (PCA) to reduce the amount of coded data. Guskov and Khodakovsky, in "Wavelet compression of parametrically coherent mesh sequences," in Proceedings of ACM/EG Symposium on Computer Animation, Grenoble, France, 2004, and Payan and Antonioni, in "Temporal wavelet-based geometry coder for 3D animations," Computer & Graphics, Vol. 31, No. 1, 2007, propose wavelet-based approaches for compression. While Guskov and Khodakovsky apply the wavelet transform for each frame separately exploiting later the temporal coherence between wavelet coefficients, Payan and Antonioni apply the wavelet transform in temporal direction on vertex trajectories and use a model-based entropy coder for entropy compression. Müller et al., in "Predictive compression of dynamic 3D meshes," in Proceedings of International Conference on Image Processing, Genova, Italy, 2005 presented a rate-distortion optimized compression scheme which exploits the coherence between motion vectors by combining octree based motion vector clustering with an optimized selection of a compression mode for each cluster.

Recently, Mamou at al., in "A skinning approach for dynamic 3D mesh compression: Research articles," Computer Animation and Virtual Worlds, Vol. 17, No. 3-4, 2006, introduced a novel technique for compression of mesh animations based on a skinning animation technique. They employ vertex clustering and propose a weighted affine transform in order to exploit inter and intra cluster dependencies for prediction.

It is thus an object of the present invention, to provide a further, in particular an improved solution for encoding and decoding of time consistent sequences, in particular 3D mesh sequences.

According to the invention it is proposed a method for encoding a time-consistent 3D mesh sequence using scalable coding, the method comprising the steps of:

receiving successive frames of a 3D mesh sequence, wherein a frame comprises a set of vertices ($\mathcal{V}$) with associated connectivity ($\mathcal{K}$) and wherein the connectivity ($\mathcal{K}$) is identical for all frames of the 3D mesh sequence, decomposing the 3D mesh sequence into a multi-resolution representation comprising two or more spatial layers represented by disjoint sets of vertices ($\mathcal{V}_i$) with associated connectivities ($\mathcal{K}_i$) and encoding the vertices of the layers using an encoder.

According to a further embodiment it is proposed a method for encoding, wherein the decomposition is calculated from the connectivity ($\mathcal{K}$) of the 3D mesh sequence irrespectively of location data of the vertices and/or whereby a scalable predictive coding is used.

According to a further embodiment it is proposed a method for encoding comprising the steps:

encoding the connectivity ($\mathcal{K}$) of the 3D mesh sequence for a first frame of the sequence, and selecting for each frame a compression method from a group of compression methods comprising I-frame compression and P-frame compression and/or B-frame compression.

According to a further embodiment it is proposed a method for encoding, wherein the step of decomposing the 3D mesh sequence into a multi-resolution representation comprises the steps of:

setting a value of numberOfDecomposedLayers denoting the number of layers (L) for decomposition, encoding the set number of layers (L) for the decomposition, selecting one or more patches comprising sets of triangles having one middle vertex in common, the middle vertex having a valence not more than a predefined number, in particular not more than 6, the valence being defined by the number of direct neighbour vertices of said middle vertex, removing the middle vertices of said one or more selected patches and generating a decomposed layer ($\mathcal{V}_l$) defined by said removed middle vertices with associated connectivity ($\mathcal{K}_L$), determining a simplified connectivity associated to the remaining set of vertices, repeating the steps of selecting one or more patches, removing the middle vertices, and determining a simplified connectivity for a number of iterations (L−2) being by 2 less than the number of set layers on the respective remaining sets of vertices with associated simplified connectivities to generate decomposed layers ($\mathcal{V}_{L-1}, \ldots, \mathcal{V}_2$) with associated connectivities ($\mathcal{K}_{L-1}, \ldots, \mathcal{K}_2$), and defining the remaining set of vertices ($\mathcal{V}_i$) with associated connectivity ($\mathcal{K}_i$) as a base layer.

According to a further embodiment it is proposed a method for encoding, wherein the step of determining a simplified connectivity associated to the remaining set of vertices comprises the step of:

triangulating the vertices of the former 1-ring neighborhood of a removed vertex, wherein the 1-ring neighborhood is defined by all vertices being a direct neighbour of a vertex, wherein a triangulation is selected based on an average absolute deviation of the valences of the vertices of the 1-ring neighborhood of the removed vertex from a valence equal to a predefined number, in particular equal to 6, with respect to the triangulation and the connectivity ($\mathcal{K}_i$) associated to the layer.

According to a further embodiment it is proposed a method for encoding, wherein the step of encoding the vertices of the layers using a predictive encoder comprises the step of:

selecting a compression method for each frame being selected of the group comprising of an I-frame compression and a P-frame compression and/or a B-frame compression and generating a prediction error using an I-frame predictor, a P-frame predictor, or a B-frame predictor respectively.

According to a further embodiment it is proposed a method for encoding, wherein an I-frame compression for a current vertex of a current frame comprises calculating an I-frame predictor as an average of the locations of an already encoded 1-ring neighbourhood of said current vertex in said current frame.

According to a further embodiment it is proposed a method for encoding, wherein a P-frame compression for a current vertex of a current frame, considering an already encoded frame as a reference frame comprises calculating a P-frame predictor by adding up an I-frame predictor of the current vertex of the current frame calculated according to an embodiment explained above and the difference of the location of the current vertex in the reference frame and an I-frame predictor of the current vertex of the reference frame calculated according to said embodiment explained above, respectively.

According to a further embodiment it is proposed a method for encoding, whereby said difference is multiplied by a Rotation Matrix (A).

According to a further embodiment it is proposed a method for encoding, wherein a B-frame compression for a current vertex of a current frame, considering two already encoded frames as a first reference frame and second reference frame respectively, comprises calculating a B-frame predictor by calculating an average, in particular a weighted average of a P-frame predictor according to an embodiment explained above considering the first reference frame and a P-frame predictor according to said embodiment explained above considering the second reference frame.

According to a further embodiment it is proposed a method for encoding, wherein an information for specifying the chosen predictor is encoded whereby the predictor is encoded frame-wise or layer-wise, in particular using a fixed number of bits.

According to a further embodiment it is proposed a method for encoding, wherein the step of encoding the vertices of the layers using a predictive encoder further comprises the steps of:

quantising the prediction error, and encoding the quantised prediction error.

According to a further embodiment it is proposed a method for encoding, wherein the prediction error is uniformly quantized in particular using a value of coordsQuantizationStep as a quantization bin size ($\Delta$).

According to a further embodiment it is proposed a method for encoding, wherein each component of the quantized prediction error is encoded separately using entropy encoding.

According to a further embodiment it is proposed a method for encoding, wherein the entropy encoding of a component of the quantized prediction error uses arithmetic coding for values laying inside a predefined domain of integer values, in particular a predefined domain ranging from −3 to +3, and Golomb codes for values outside of the predefined domain of integer values.

According to a further embodiment it is proposed a method for encoding, wherein separate arithmetic encoders are used for each layer and wherein each arithmetic encoder is adapted to use statistical distributions of quantized prediction errors obtained from already encoded frames.

According to a further embodiment it is proposed a method for encoding, wherein optimal reference frames are determined in order to improve prediction accuracy and wherein side information for identifying the determined reference frames is encodedand/or reference frame numbers are encoded in the current frame as values of refFrameNumberOffset0 or refFrameNumberOffset0 and refFrameNumberOffset1 each denoting an offset to the current frame's frame number.

According to the invention it is proposed a encoder for encoding a time-consistent 3D mesh sequence using scalable predictive coding, comprising:

receiving means for receiving successive frames of a 3D mesh sequence, wherein a frame comprises a set of vertices ($\mathcal{V}$) with associated connectivity ($\mathcal{K}$) and wherein the connectivity ($\mathcal{K}$) is identical for all frames of the 3D mesh sequence, decomposition means for decomposing the 3D mesh sequence into a multi-resolution representation comprising two or more spatial layers represented by disjoint sets of vertices ($\mathcal{V}_i$) with associated connectivities ($\mathcal{K}_i$) and encoding means for encoding the vertices of the layers using a predictive encoder.

According to a further embodiment it is proposed an encoder, wherein the decomposition is calculated from the connectivity ($\mathcal{K}$) of the 3D mesh sequence irrespectively of location data of the vertices.

According to a further embodiment it is proposed an encoder, comprising:

connectivity encoding means for encoding the connectivity ($\mathcal{K}$) of the 3D mesh sequence for a first frame of the sequence, and selection means for selecting for each frame a compression method from a group of compression methods comprising I-frame compression and P-frame compression and/or B-frame compression.

According to a further embodiment it is proposed an encoder, comprising:

triangulating means for triangulating vertices of a former 1-ring neighborhood of a removed vertex, wherein the 1-ring neighborhood is defined by all vertices being a direct neighbour of a vertex, wherein a triangulation is selected based on an average absolute deviation of the valences of the vertices of the 1-ring neighborhood of the removed vertex from a valence equal to a predefined number, in particular equal to 6, with respect to the triangulation and the connectivity ($\mathcal{K}_i$) associated to the current layer, the valence being defined by the number of direct neighbour vertices of a vertex.

According to a further embodiment it is proposed an encoder, comprising:
  a selecting means for selecting a compression method for each frame being selected of the group comprising of
    an I-frame compression and
    a P-frame compression and/or
    a B-frame compression,
  and whereby the encoder is adapted for generating a prediction error using an I-frame predictor, a P-frame predictor, or a B-frame predictor respectively.

According to a further embodiment it is proposed an encoder, comprising an information encoding means for specifying and encoding the chosen predictor whereby the predictor is encoded frame-wise or layer-wise, in particular using a fixed number of bits.

According to a further embodiment it is proposed an encoder, comprising:
  quantisation means for quantising the prediction error in particular using a value of coordsQuantizationStep as a quantization bin size (Δ),
  error encoding means for encoding the quantised prediction error and/or
  an entropy encoding means for encoding of a component of the quantized prediction error using arithmetic coding for values laying inside a predefined domain of integer values, in particular a predefined domain ranging from −3 to +3, and Golomb codes for values outside of the predefined domain of integer values.

According to a further embodiment it is proposed an encoder, comprising a side information encoding means for encoding side information for identifying determined reference frames in particular being adapted for encoding reference frame numbers in the current frame as values of refFrameNumberOffset0 or refFrameNumberOffset0 and refFrameNumberOffset1 each denoting an offset to the current frame's frame number.

It is also proposed an encoder for encoding a time-consistent 3D mesh sequence, in particular in carrying out a method according to embodiments explained above, comprising:
  a 3D mesh sequence block for receiving successive frames of a 3D mesh sequence, wherein a frame comprises a set of vertices ($\mathcal{V}$) and associated connectivity ($\mathcal{K}$) and wherein the connectivity ($\mathcal{K}$) is identical for all frames of the 3D mesh sequence,
  a connectivity encoder block for encoding the connectivity ($\mathcal{K}$) of the 3D mesh sequence for a first frame of the sequence,
  a layer designer block for decomposing the 3D mesh sequence into a multi-resolution representation comprising two or more spatial layers represented by disjoint sets of vertices ($\mathcal{V}_i$) with associated connectivities ($\mathcal{K}_i$), wherein the decomposition is calculated from the connectivity ($\mathcal{K}$) of the 3D mesh sequence irrespectively of location data of the vertices,
  a frame order controller block for selecting for each frame a compression method from a group of compression methods comprising I-frame compression, P-frame compression, and B-frame compression,
  a DPCM encoder block for encoding the vertices of the layers using a predictive encoder, and
  a layer compression controller block for controlling the encoding and for selecting a predictor for predicting a vertex in the DPCM encoder block.

It is further proposed an encoder for encoding a time-consistent 3D mesh sequence adapted for carrying out the encoding method according to any of the embodiments explained above.

According to the invention it is proposed a method for decoding a data signal representing an encoded time-consistent 3D mesh sequence defined by frames, each frame comprises a set of vertices ($\mathcal{V}$) with associated connectivity ($\mathcal{K}$) and wherein the connectivity ($\mathcal{K}$) is identical for all frames of the 3D mesh sequence, encoded by using scalable coding, the method comprising the steps of:
  receiving the data signal,
  decoding the connectivity ($\mathcal{K}$) of the 3D mesh sequence,
  decomposing the 3D mesh sequence or its connectivity into a multi-resolution representation comprising two or more spatial layers represented by disjoint sets of vertices ($\mathcal{V}_i$) with associated connectivities ($\mathcal{K}_i$) and
  decoding the vertices of the layers using a decoder.

According to a further embodiment it is proposed a decoding method, wherein the decomposition is calculated from the connectivity ($\mathcal{K}$) of the 3D mesh sequence irrespectively of location data of the vertices and/or whereby a scalable predictive decoding is used.

According to a further embodiment it is proposed a decoding method, further comprising the step:
  decoding for each frame and/or for each layer information specifying a compression method as used by the coder, in particular decoding reference frame numbers representing the numbers of reference frames.

According to a further embodiment it is proposed a decoding method, whereby the used compression method is chosen from a group of compression methods comprising I-frame compression and P-frame compression and/or B-frame compression.

According to a further embodiment it is proposed a decoding method, wherein decomposing the 3D mesh sequence into a multi-resolution representation comprises:
  decoding a value of numberOfDecomposedLayers denoting the number of layers (L) as received from a coder,
  selecting one or more patches and/or decoding information identifying one or more patches comprising sets of triangles having one middle vertex in common, the middle vertex having a valence not more than a predefined number, in particular not more than 6, the valence being defined by the number of direct neighbour vertices of said middle vertex,
  removing the middle vertices of said one or more selected patches and generating a decomposed layer ($\mathcal{V}_L$) defined by said removed middle vertices with associated connectivity ($\mathcal{K}_L$),
  determining a simplified connectivity associated to the remaining set of vertices,
  repeating the steps of selecting one or more patches, removing the middle vertices, and determining a simplified connectivity for a number of iterations (L−2) being by 2 less than the decoded number of layers on the respective remaining sets of vertices with associated simplified connectivities to generate decomposed layers ($\mathcal{V}_{L-1}, \ldots, \mathcal{V}_2$) with associated connectivities ($\mathcal{K}_{L-1}, \ldots, \mathcal{K}_2$), and
  defining the remaining set of vertices ($\mathcal{V}_1$) with associated connectivity ($\mathcal{K}_1$) as a base layer.

According to a further embodiment it is proposed a decoding method, wherein the step of determining a simplified connectivity associated to the remaining set of vertices comprises the step of:

triangulating the vertices of the former 1-ring neighborhood of a removed vertex, wherein the 1-ring neighborhood is defined by all vertices being a direct neighbour of a vertex, wherein a triangulation is selected based on an average absolute deviation of the valences of the vertices of the 1-ring neighborhood of the removed vertex from a valence equal to a predefined number, in particular equal to 6, with respect to the triangulation and the connectivity ($\mathcal{K}_i$) associated to the layer.

According to a further embodiment it is proposed a decoding method, comprising the steps of determining a predictor according to the specified compression method, decoding a prediction error and calculating a prediction value and/or the location data of the corresponding vertex based on the specified predictor and the decoded prediction error whereby the steps are performed preferably in each layer.

According to a further embodiment it is proposed a decoding method, comprising the step of decoding the location data of the vertices of a base layer.

According to a further embodiment it is proposed a decoding method, wherein in case of an I-frame compression for a current vertex of a current frame the method comprises calculating an I-frame predictor as an average of the locations of an already decoded 1-ring neighbourhood of said current vertex in said current frame.

According to a further embodiment it is proposed a decoding method, wherein in case of a P-frame compression for a current vertex of a current frame the method comprises, considering an already decoded frame as a reference frame and calculating a P-frame predictor by adding up an I-frame predictor of the current vertex of the current frame calculated according to an embodiment explained above and the difference of the location of the current vertex in the reference frame and an I-frame predictor of the current vertex of the reference frame calculated according to said embodiment explained above respectively.

According to a further embodiment it is proposed a decoding method, whereby said difference is multiplied by a Rotation Matrix (A).

According to a further embodiment it is proposed a decoding method, wherein in case of a B-frame compression for a current vertex of a current frame, the method comprises considering two already decoded frames as a first reference frame and second reference frame respectively, and calculating a B-frame predictor by calculating an average, in particular a weighted average, of a P-frame predictor according to any of the corresponding embodiments explained above considering the first reference frame and a P-frame predictor according to any of said embodiments explained above considering the second reference frame.

According to a further embodiment it is proposed a decoding method, wherein an information for specifying the chosen predictor is decoded frame-wise or layer-wise, in particular using a fixed number of bits.

According to a further embodiment it is proposed a decoding method, wherein an entropy decoding is used.

According to a further embodiment it is proposed a decoding method, wherein the entropy decoding uses arithmetic coding for values laying inside a predefined domain of integer values, in particular a predefined domain ranging from −3 to +3, and Golomb codes for values outside of the predefined domain of integer values, in particular using separate arithmetic encoders for each layer and wherein each arithmetic decoder is adapted to use statistical distributions of quantized prediction errors, in particular being quantized using a value of coordsQuantizationStep as a quantization bin size (Δ) obtained from already decoded frames.

According to a further embodiment it is proposed a decoding method, wherein the method is adapted to decode a data signal being coded by a method according to any of the embodiments described above with respect to a method for encoding and/or encoded a by an encoder according to any of the embodiments above describing an encoder.

According to the invention it is proposed a decoder for decoding a data signal representing an encoded time-consistent 3D mesh sequence defined by frames, each frame comprises a set of vertices ($\mathcal{V}$) with associated connectivity ($\mathcal{K}$) and wherein the connectivity ($\mathcal{K}$) is identical for all frames of the 3D mesh sequence, encoded by using scalable predictive coding, the decoder comprising:

receiving means for receiving the data signal, decoding means for decoding the connectivity ($\mathcal{K}$) of the 3D mesh sequence, decomposing means for decomposing the 3D mesh sequence into a multi-resolution representation comprising two or more spatial layers represented by disjoint sets of vertices ($\mathcal{V}_i$) with associated connectivities ($\mathcal{K}_i$) and means for decoding the vertices of the layers using a predictive decoder.

According to a further embodiment it is proposed a decoder, wherein the decomposition means is adapted to calculate the decomposition from the connectivity ($\mathcal{K}$) of the 3D mesh sequence irrespectively of location data of the vertices.

According to a further embodiment it is proposed a decoder, comprising:

decoding means for decoding for each frame information specifying a compression method as used by the coder.

According to a further embodiment it is proposed a decoder, whereby the used compression method is chosen from a group of compression methods comprising I-frame compression and P-frame compression and/or B-frame compression.

According to a further embodiment it is proposed a decoder, wherein the decomposing means for decomposing the 3D mesh sequence into a multi-resolution representation is adapted to perform the steps:

decoding a value of numberOfDecomposedLayers denoting the number of layers (L) as received from a coder, selecting one or more patches comprising sets of triangles having one middle vertex in common, the middle vertex having a valence not more than a predefined number, in particular not more than 6, the valence being defined by the number of direct neighbour vertices of said middle vertex, removing the middle vertices of said one or more selected patches and generating a decomposed layer ($\mathcal{V}_L$) defined by said removed middle vertices with associated connectivity ($\mathcal{K}_L$), determining a simplified connectivity associated to the remaining set of vertices, repeating the steps of selecting one or more patches, removing the middle vertices, and determining a simplified connectivity for a number of iterations (L−2) being by 2 less than the number of set layers on the respective remaining sets of vertices with associated simplified connectivities to generate decomposed layers ($\mathcal{V}_{L-1}, \ldots, \mathcal{V}_2$) with associated connectivities ($\mathcal{K}_{L-1}, \ldots, \mathcal{K}_2$), and defining the remaining set of vertices ($\mathcal{V}_1$) with associated connectivity ($\mathcal{K}_1$) as a base layer.

According to a further embodiment it is proposed a decoder, wherein the decoder is adapted to determine a simplified connectivity associated to the remaining set of vertices by performing the step of:

triangulating the vertices of the former 1-ring neighborhood of a removed vertex, wherein the 1-ring neighborhood is defined by all vertices being a direct neighbour of a vertex, wherein a triangulation is selected based on an average absolute deviation of the valences of the vertices of the 1-ring neighborhood of the removed vertex from a valence equal to a predefined number, in particular equal to 6, with respect to the triangulation and the connectivity ($\mathcal{K}_i$) associated to the layer.

According to a further embodiment it is proposed a decoder, comprising a predictor determining means for determining a predictor according to the specified compression method, and whereby the decoder is adapted for decoding a prediction error and calculating the location data of the corresponding vertex based on the specified predictor and the decoded prediction error.

According to a further embodiment it is proposed a decoder, comprising an entropy decoding means for decoding.

According to a further embodiment it is proposed a decoder, wherein the entropy decoding means is adapted to use arithmetic coding for values laying inside a predefined domain of integer values, in particular a predefined domain ranging from −3 to +3, and Golomb codes for values outside of the predefined domain of integer values, in particular using separate arithmetic encoders for each layer and wherein each arithmetic decoder is adapted to use statistical distributions of quantized prediction errors, in particular being quantized using a value of coordsQuantizationStep as a quantization bin size (Δ), obtained from already decoded frames.

According to the invention it is proposed a decoder for decoding a data signal representing an encoded time-consistent 3D mesh sequence, comprising:

a connectivity decoder block for decoding an encoded connectivity ($\mathcal{K}$) of the 3D mesh sequence and for saving the connectivity ($\mathcal{K}$) in a 3D mesh sequence block, a layer designer block for decomposing the 3D mesh sequence into a multi-resolution representation comprising two or more spatial layers represented by disjoint sets of vertices ($\mathcal{V}_i$) with associated connectivities ($\mathcal{K}_i$), wherein the decomposition is calculated from the connectivity ($\mathcal{K}$) of the 3D mesh sequence only, a controller means for controlling for each frame a compression method, a DPCM decoder block for decoding the vertices of the layers using a predictive decoder, and a layer compression controller block for controlling the decoding and for selecting a predictor for predicting a vertex in the DPCM decoder block.

According to a further embodiment it is proposed a decoder, whereby the controller means is designed as a frame order controller block for selecting for each frame a compression method from a group of compression methods comprising I-frame compression, P-frame compression, and B-frame compression.

According to a further embodiment it is proposed a decoder, wherein the decoder is adapted to perform a method for decoding according to any of the embodiments described above with respect to a decoding method, to decode a data signal being coded by a method according to any of the embodiments described above with respect to a encoding method and/or to decode a data signal being coded by an encoder according to any of the embodiment described above with respect to an encoder.

According to the invention it is proposed a computer program for encoding a time-consistent 3D mesh sequence, the computer program comprising program code means for causing an encoding device to carry out steps of a coding method according to the invention, when the computer program is run on a computer controlling the encoding device.

According to the invention it is proposed a computer program for decoding a data signal representing an encoded time-consistent 3D mesh sequence, the computer program comprising program code means for causing a decoding device to carry out steps of a decoding method according to the invention, when the computer program is run on a computer controlling the decoding device.

According to the invention it is proposed a coded signal representing a coded time-consistent 3D mesh sequence being encoded according to a method according to the invention.

According to the invention it is proposed a method for encoding a time-consistent sequence of texture coordinates or of normal vectors using scalable predictive coding, the method comprising the steps of:

receiving successive frames of a sequence of texture coordinates or of normal vectors, wherein a frame comprises a set of texture coordinates or of normal vectors with associated connectivity ($\mathcal{K}$) and wherein the connectivity ($\mathcal{K}$) is identical for all frames of the corresponding sequence of texture coordinates or of normal vectors, decomposing the sequence of texture coordinates or of normal vectors into a multi-resolution representation comprising two or more spatial layers represented by disjoint sets of texture coordinates or of normal vectors with associated connectivities ($\mathcal{K}_i$), and encoding the texture coordinates or normal vectors of the layers using a predictive encoder.

According to a further embodiment it is proposed a method for encoding a time-consistent sequence of texture coordinates or of normal vectors, comprising features of encoding a time-consistent sequence according to the embodiments described above with respect to an encoding method for encoding a time consistent 3D mesh sequence.

According to the invention it is proposed a method for decoding a data signal representing a time-consistent sequence of texture coordinates or of normal vectors being encoded using scalable coding, wherein the method is adapted to decode a data signal being encoded according to a method according to the embodiments described above with respect to an encoding method for encoding a time consistent 3D mesh sequence.

According to the invention it is proposed a encoder for encoding a time-consistent sequence of texture coordinates or of normal vectors adapted to perform a method according to the present invention.

According to the invention it is proposed a decoder for decoding a data signal representing an encoded time-consistent sequence of texture coordinates or of normal vectors adapted to perform a method according to the invention.

Commonly the term numberOfDecomposedLayers is used to denote the number of layers (L) for the decomposition, the term coordsQuantizationStep is used to denote the quantization bin size, the term refFrameNumberOffset0 is used to denote the reference frames number offset of P-frames and the terms refFrameNumberOffset0 and refFrameNumberOffset1 are used to denote the reference frames number offset of B-frames.

These and other aspects of the invention are apparent from and will be elucidated by reference to the embodiments described hereinafter and with respect to the following figures.

Figure 2:
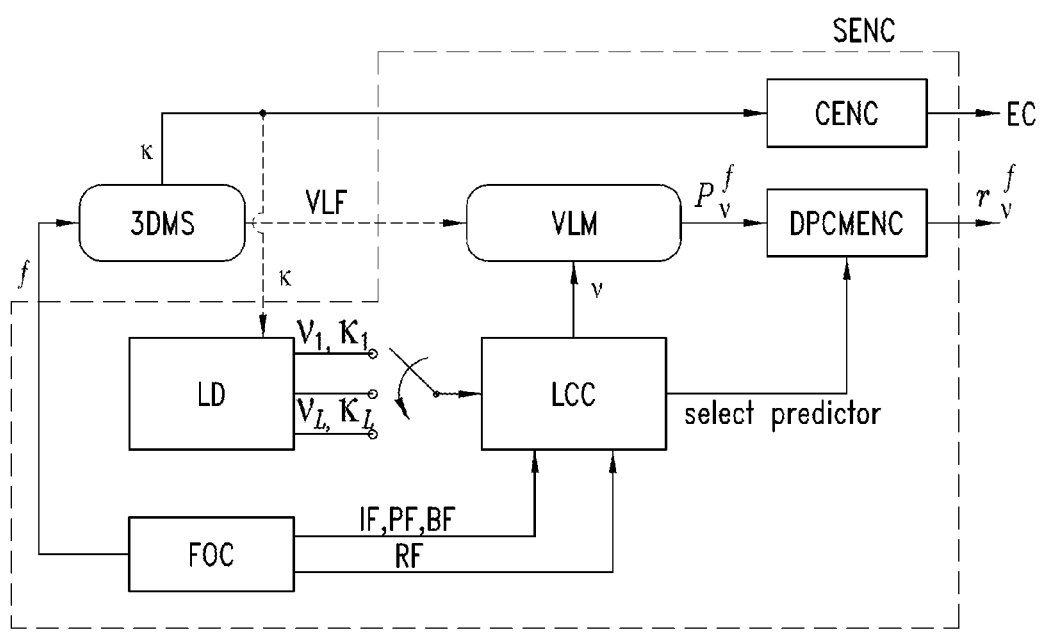
Figure 3:
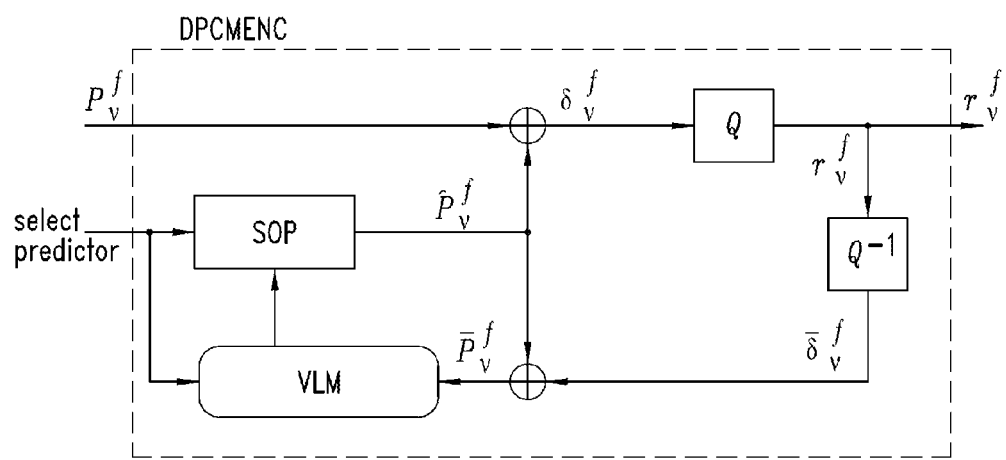
Figure 4:
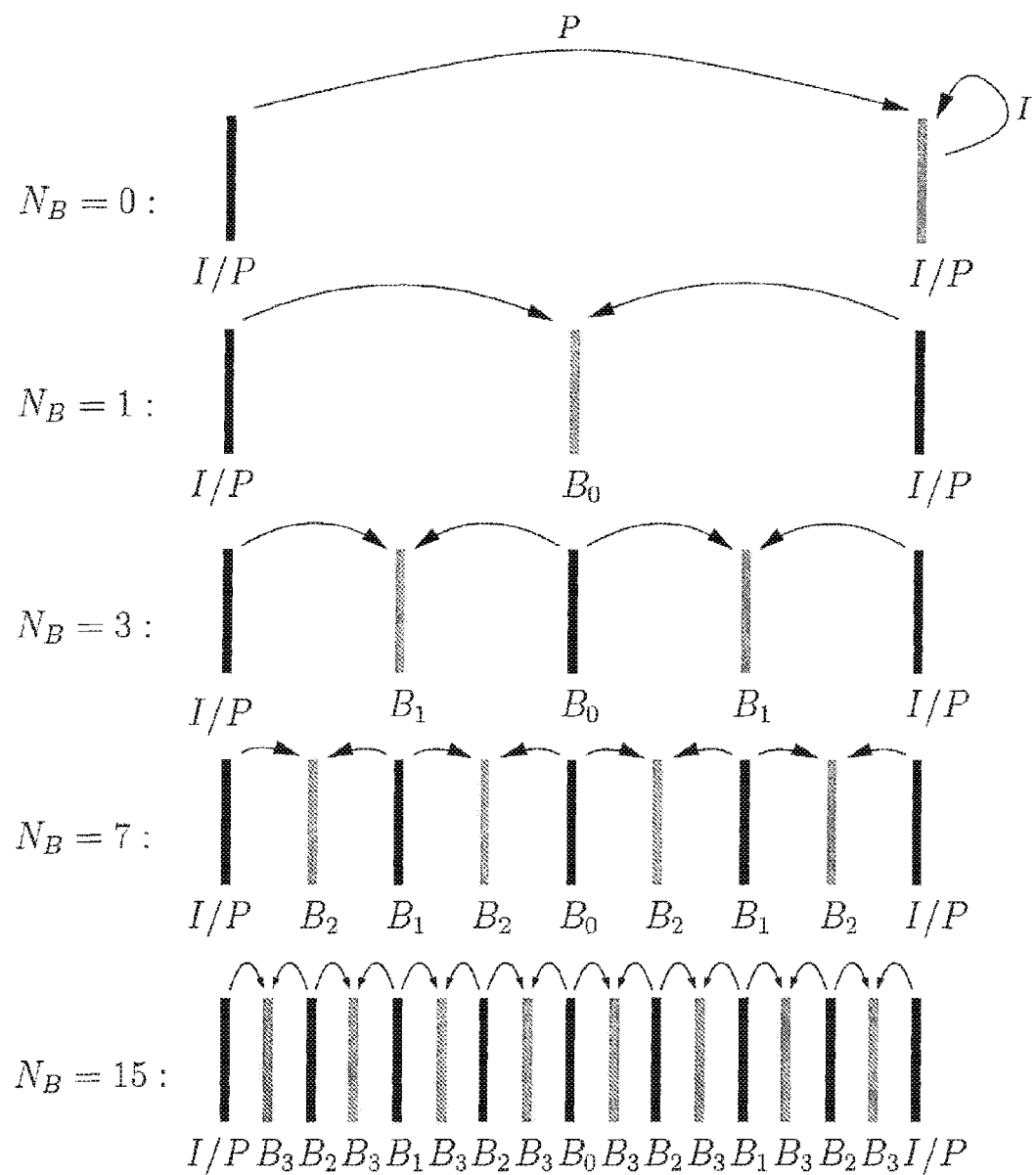
Figure 5:
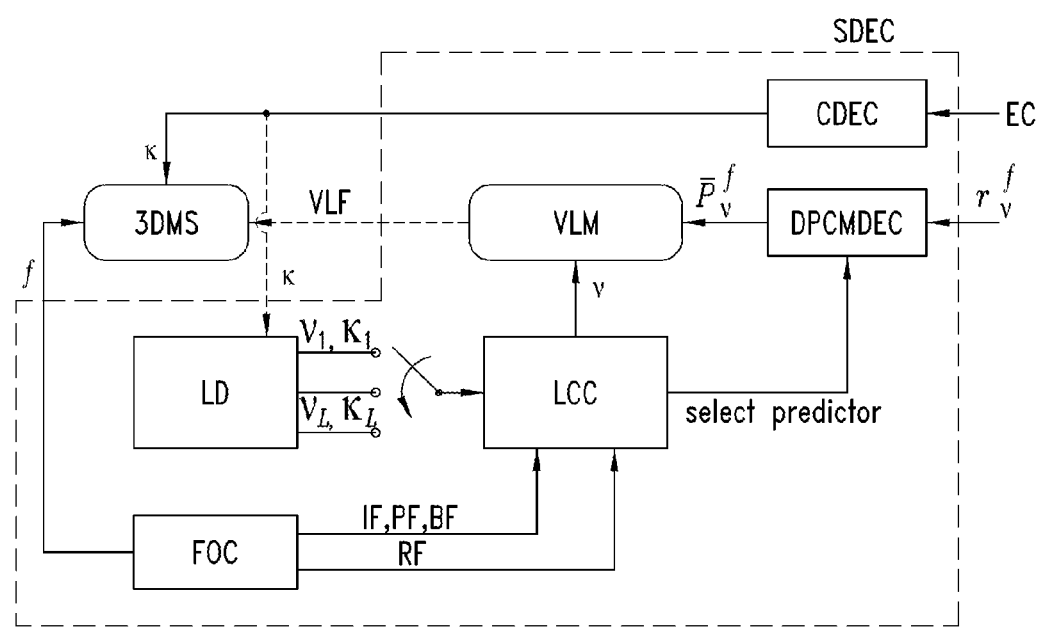
Figure 6:
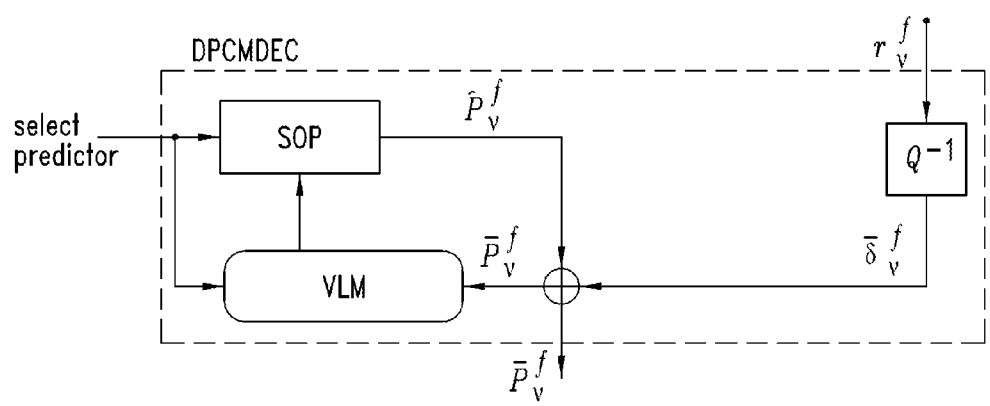
Figure 7A:
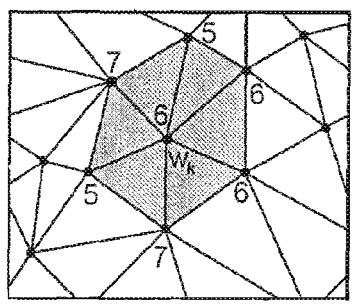
Figure 8:
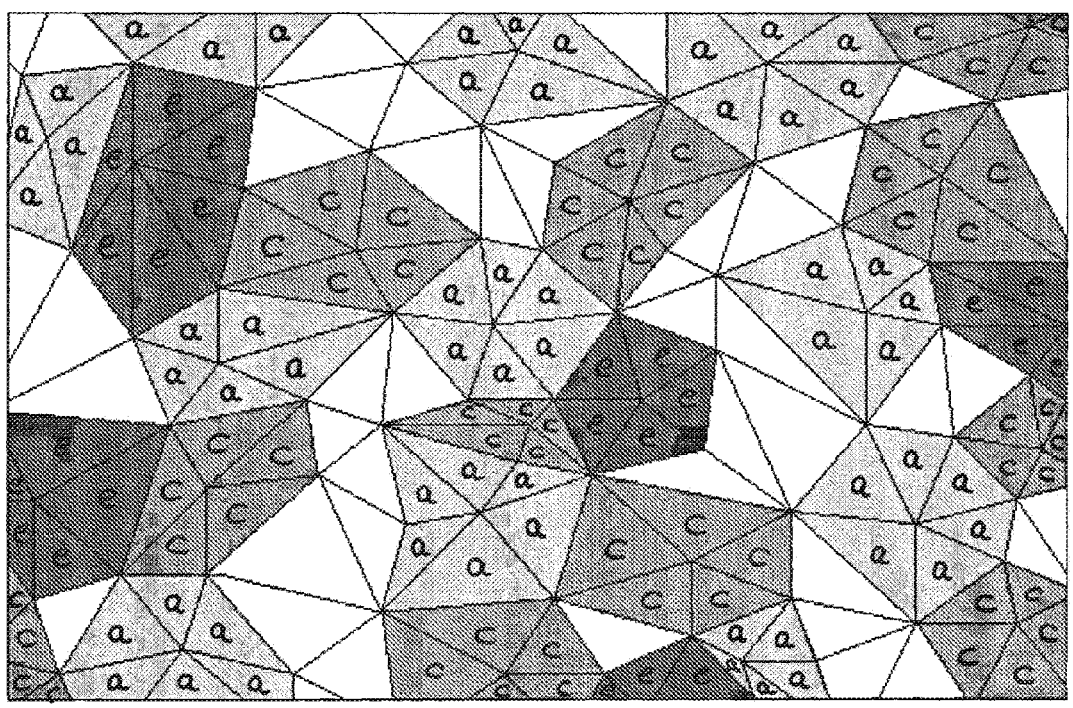
Figure 9:
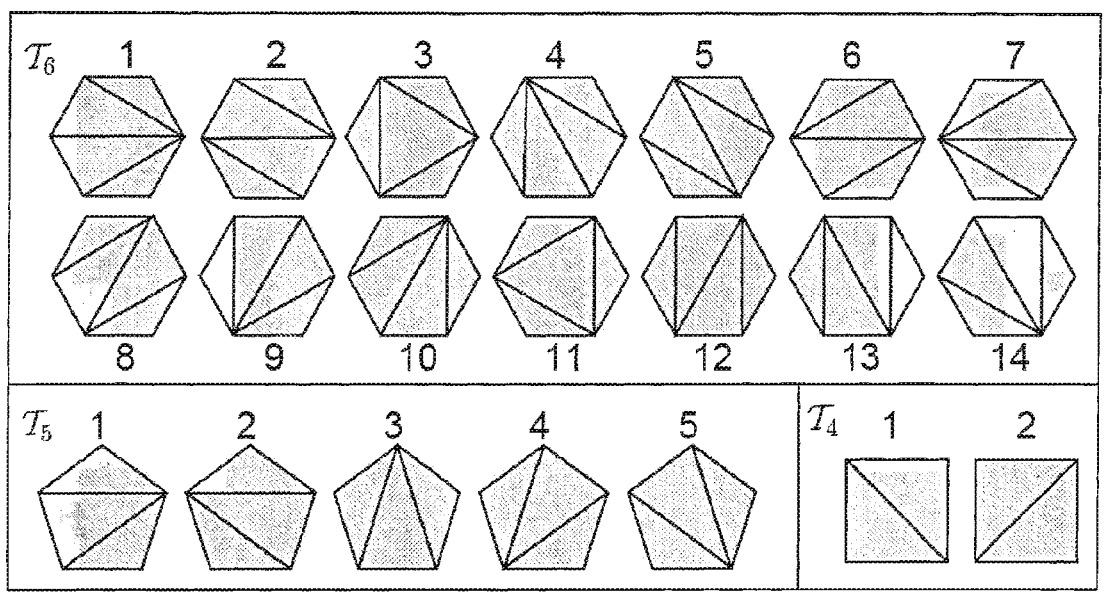
Figure 10:
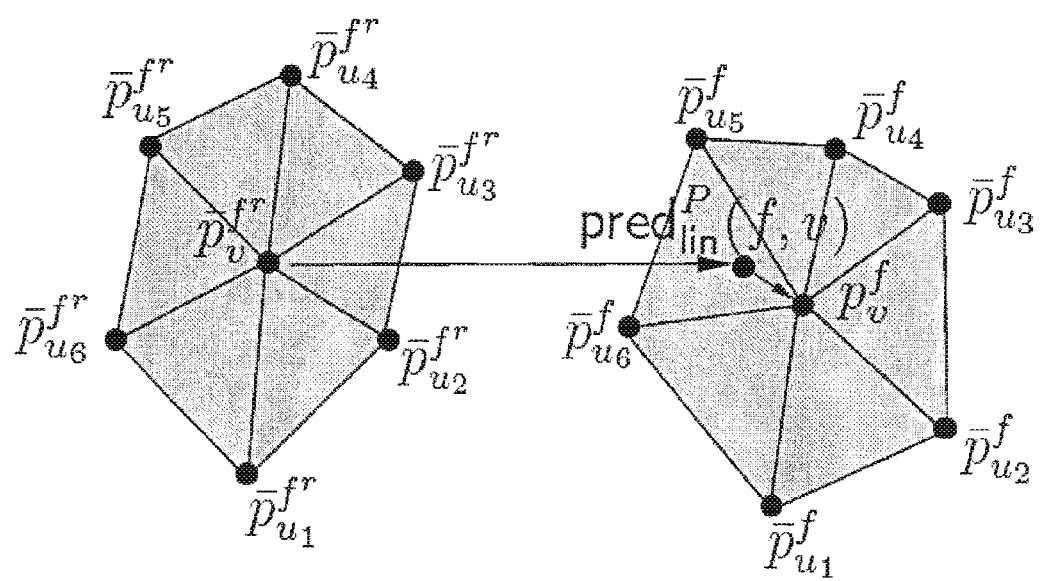
Figure 11:
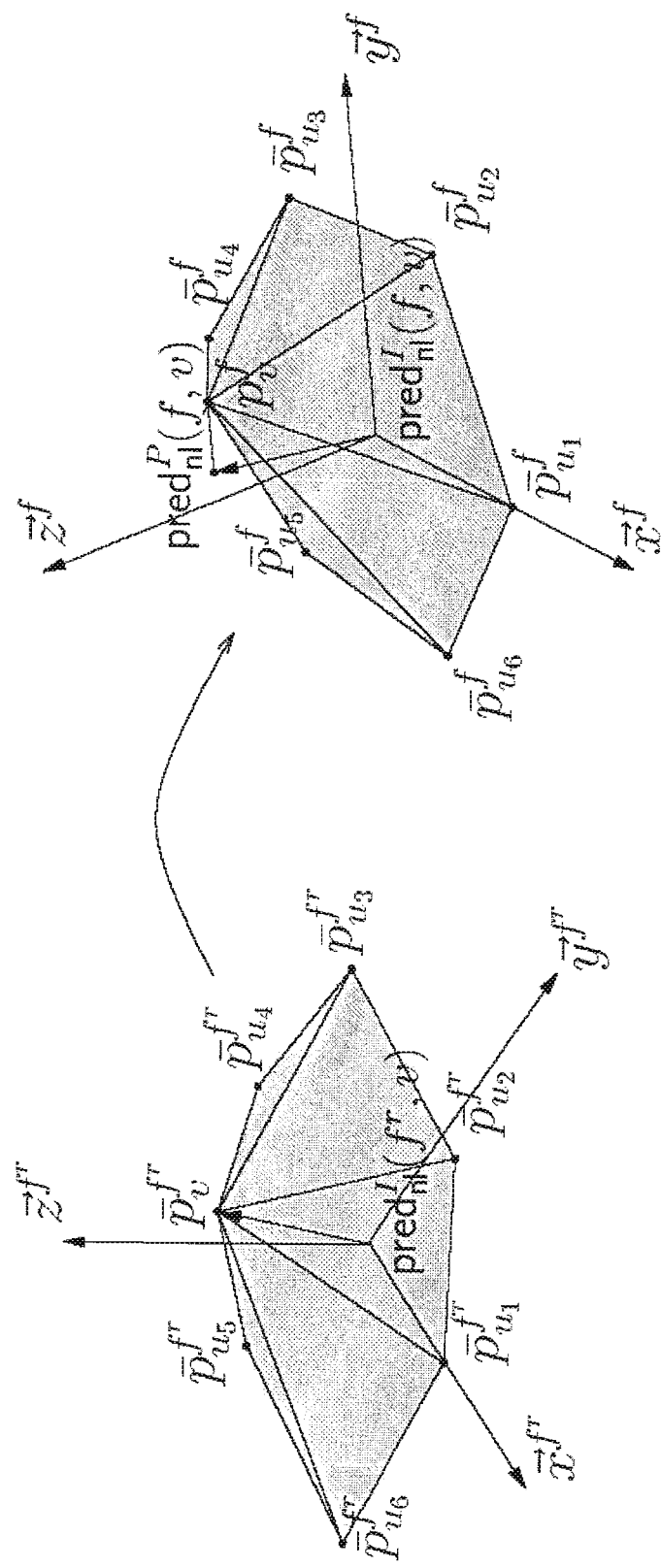
Figure 12:
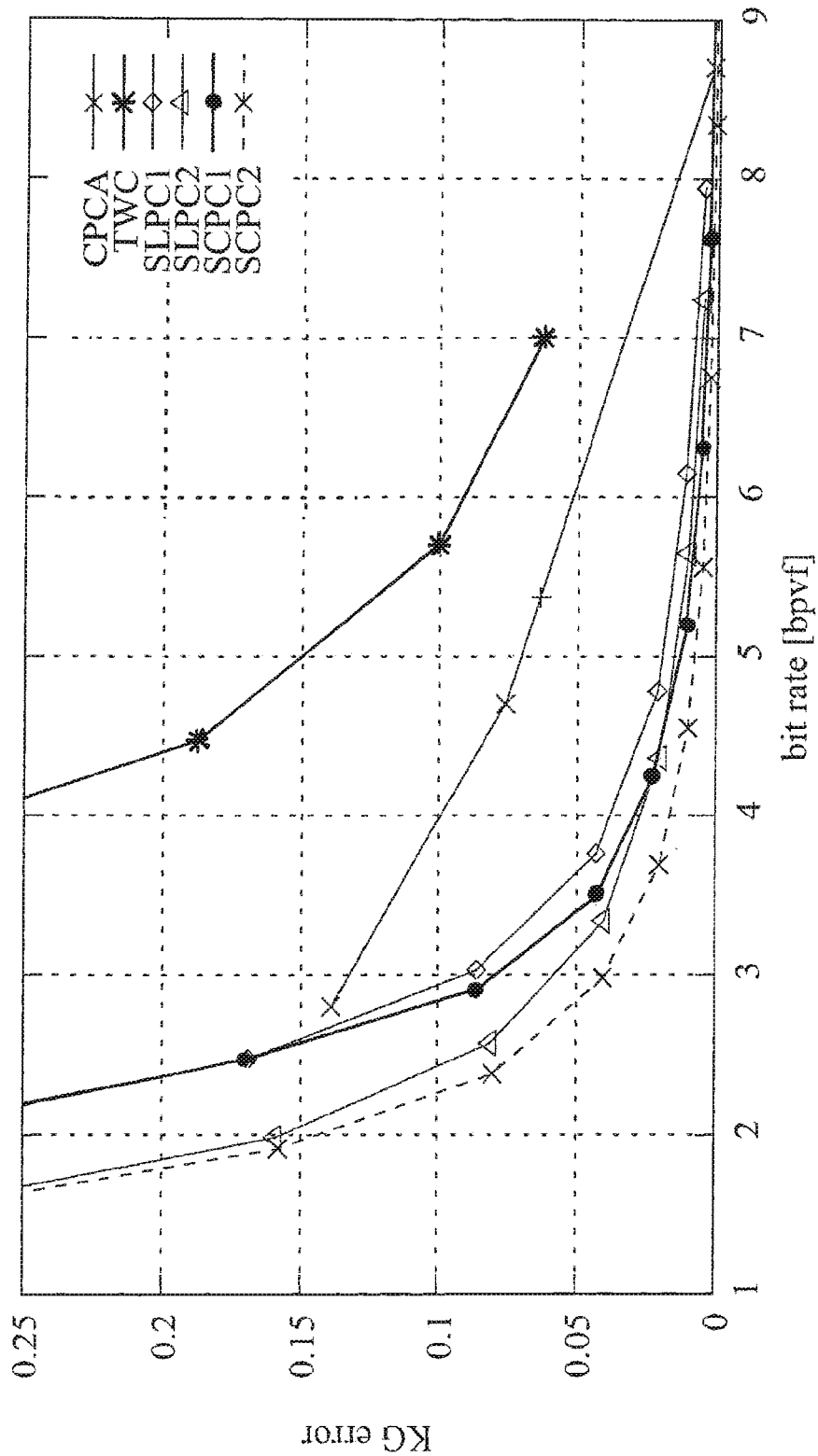
Figure 13:
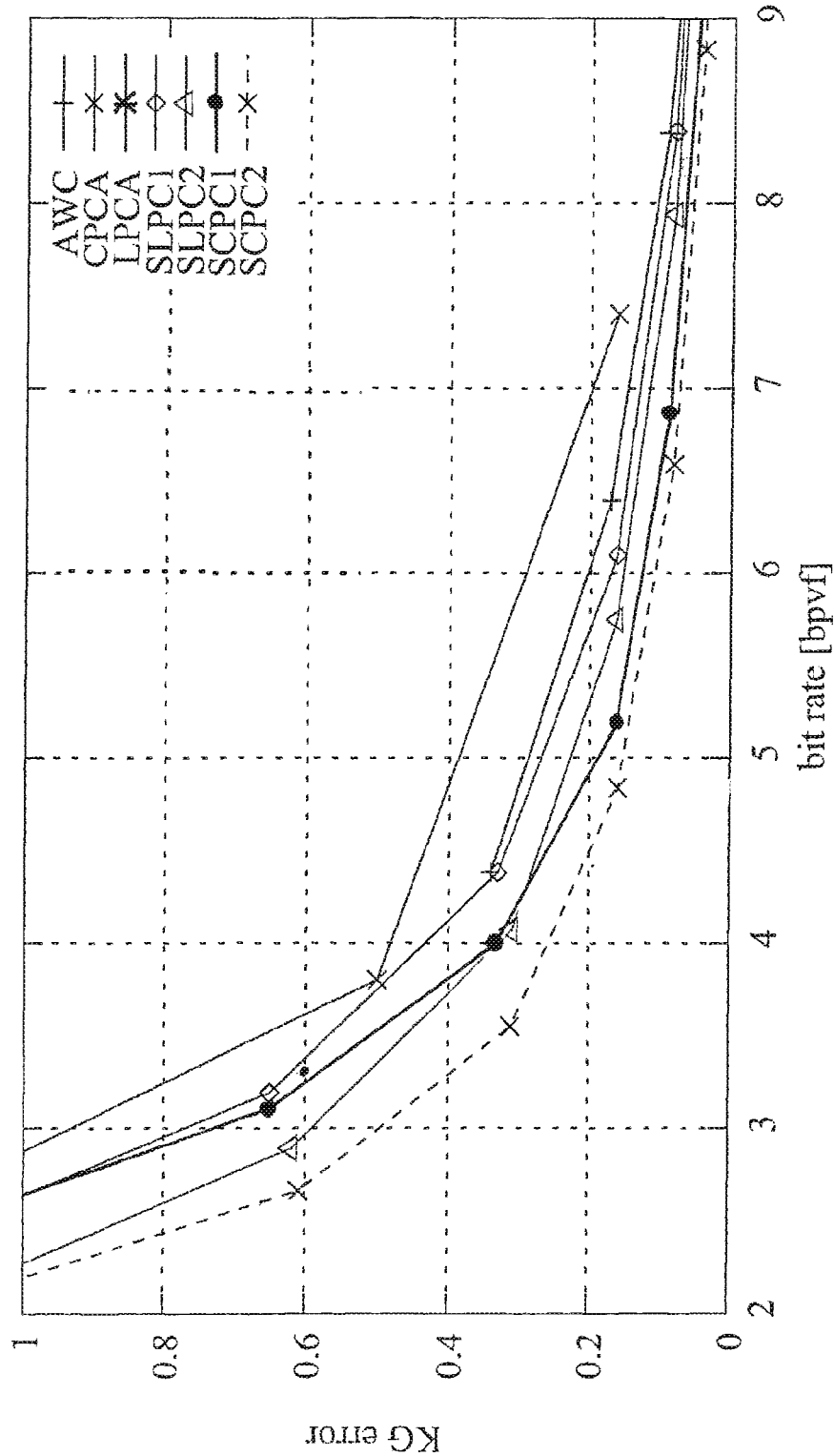

FIG. 1 illustrates a decomposition of two frames into three layers,

FIG. 2 shows a block diagram of a scalable encoder for time-consistent 3D mesh sequences, FIG. 3 shows a block diagram of a DPCM encoder for vertex locations, FIG. 4 illustrates the prediction order for hierarchical B-frames, FIG. 5 shows a block diagram of a scalable decoder for time-consistent 3D mesh sequences, FIG. 6 shows a block diagram of a DPCM decoder for vertex locations, FIGS. 7a,b,c illustrate patch-based vertex removal: (a) a degree-6 patch with middle vertex $w_k$, (b) patch after removal of $w_k$, (c) re-triangulated patch, FIG. 8 illustrates the decomposition of mesh connectivity in patches with degree $\leq 6$, FIG. 9 illustrates the possible triangulations $T_d$ for d=4, 5, 6, FIG. 10 illustrates P-frame prediction of location $p_v^f$ in layer/based on $\bar{p}_v^f$ and locations of neighboring vertices $\mathcal{N}_{\mathcal{K}_l}(v) = \{u_1, \ldots, u_6\}$ in frames f' and f, FIG. 11 illustrates P-frame prediction of location $p_v^f$ in layer 1 based on $\bar{p}_v^f$ and locations of neighboring vertices $\mathcal{N}_{\mathcal{K}_l}(v) = \{u_1, \ldots, u_6\}$ in frames f' and f, FIG. 12 illustrates the sequence Chicken encoded using l=8 layers, and FIG. 13 illustrates the sequence Cow encoded using l=6 layers.

SCALABLE COMPRESSION

In its generic form, time-varying 3D content is represented by a sequence of 3D meshes called frames. Each frame consists of two types of data: connectivity and geometry, i.e. 3D vertex locations. We assume that we are dealing with frames that have time-consistent connectivity, i.e. all frames have identical connectivity. Connectivity is compressed in the beginning of the encoding process using Touma and Gotsman's approach (in "Triangle mesh compression," in Proceedings of Graphics Interface Conference, Vancouver, Canada, 1998). Hence, connectivity can be exploited by the encoder and decoder for compression of vertex locations, just from the beginning of the compression process. It is also possible to encode connectivity with any other connectivity compression algorithm. Since connectivity is encoded only once, the major part of an encoded mesh sequence consists of encoded vertex locations.

In this section we give an overview of the scalable encoder and decoder, and describe later on the main components in detail. We begin by introducing some notational conventions.

Notation

We assume that we have a time-consistent 3D mesh sequence as input consisting of F frames with V vertices per frame and connectivity $\mathcal{K}$. We separate our notation of vertices $v \in \mathcal{K}$, which refer to nodes in mesh connectivity $\mathcal{K}$, from associated vertex locations in $R^3$. Since the vertex location of a particular vertex v in general changes depending of the frame f=1, ..., F, we denote the vertex location of vertex v in frame f by $p_v^f$.

Connectivity $\mathcal{K}$ is here represented by an abstract simplical complex (Lee at al., in "Maps: Multiresolution adaptive parametrization of surfaces," in Proceedings of ACM SIGGRAPH, Orlando, Fla., USA, 1998), which contains all the adjacency information. It consists of subsets of the set of vertex indices $\{1, \ldots, V\}$. Subsets come in 3 types: vertices $v=\{i\} \in \mathcal{K}$, edges $e=\{i,j\} \in \mathcal{K}$, and faces $t=\{i,j,k\} \in \mathcal{K}$. Consequently, two vertices $\{i\}$ and $\{j\}$ are neighbors if $\{i,j\} \in \mathcal{K}$. We denote the 1-ring neighborhood of vertex $v=\{i\}$ with respect to connectivity $\mathcal{K}$ as $$\mathcal{N}_{\mathcal{K}}(v) = \{\{j\} \in \mathcal{K} \{i,j\} \in \mathcal{K}\}.$$

The set of all vertices is denoted by $\mathcal{V} = \{\{i\} \in \mathcal{K}\}$. Furthermore, disjoint sets of vertices $V_l$ for $1 \leq l \leq L$ which have the property $\cup_{l=1}^L \mathcal{V}_l = \mathcal{V}$ are referred as layers, see FIG. 1. We will associate to each layer $\mathcal{V}_l$ a connectivity denoted with $\mathcal{K}_l$ satisfying $\cup_{k=1}^l \mathcal{V}_k = \mathcal{K}_l \cup \mathcal{V}$, i.e. $\mathcal{K}_l$ is a connectivity describing the adjacency information of exactly all vertices contained in the first/layers. FIG. 1 illustrates the decomposition of two frames f=0 and f=280 of a 3D mesh sequence into three layers $\mathcal{V}_1$, $\mathcal{K}_1$, $\mathcal{V}_1$, $\cup \mathcal{V}_2$ $\mathcal{K}_2$, and $\mathcal{V}_1$, $\mathcal{V}_2$, $\cup \mathcal{V}_3$, $\mathcal{K}_3$.

Coder Overview

In this subsection we give an overview of the components of the encoder and decoder and describe the principle data flow between them.

This coder encodes vertex locations following the predictive coding paradigm and supports scalability. A block diagram describing the coder with its components is shown in FIG. 2. The coder, i.e. the encoder, is identified by SENC in FIG. 2. The coder has as input a time-consistent sequence of 3D meshes consisting of F frames with V vertices per frame and connectivity $\mathcal{K}$. The time-consistent sequence of 3D meshes is identified by 3DMS in FIG. 2. First, connectivity IC is encoded. The connectivity is encoded by a Connectivity Encoder, identified by $\mathcal{K}$ CENC in FIG. 2. The output of the Connectivity Encoder is encoded connectivity, identified by EC in FIG. 2. Thereafter, the Layer Designer component exploits connectivity $\mathcal{K}$ in order to determine layers $\mathcal{V}_l$ with associated connectivities $\mathcal{K}_l$. The Layer Designer is identified by LD in FIG. 2.

The whole encoding process is controlled by the Frame Order Controller. The Frame Order Controller is identified by FOC in FIG. 2. Note that while frames are displayed in order f=1, 2, 3, ... they have not to be compressed in display order, if there is another frame order which allows a better exploitation of interframe dependencies for compression. The Frame Order Controller determines in which order frames are compressed, which type of compression is performed for each frame (I-, P-, and B-frame compression), and which already encoded frames, called reference frames are exploited for predictive compression. Determined reference frames are identified by RF in FIG. 2. We distinguish between I-, P-, and B-frame compression, i.e. intra frame (I) compression, which exploits only encoded vertex locations of the current frame for compression, one-directional predictive (P) compression, which uses encoded locations of the current frame and one (or more) previously encoded I- or P-frame as reference frame, and bi-directional (B) predictive compression, which uses encoded locations of the current frame and two (or more) previously encoded frames, which can be I-, P- or B-frames as reference frames for prediction. I-frames, P-frames, and B-frames are identified by IF, PF, and BF, respectively, in FIG. 2.

We assume that the first frame f=1 is always an I-frame. Let $N_{PB}$ denote the number of P- and B-frames between two successive I-frames and let $N_B$ denote the number of B-frames between two successive I- or P-frames. Thus, specifying $N_{PB}$ and $N_B$, a frame type for each frame is welldefined. This also implies an order of compression. Exemplary, we want to mention the following two orders of display (DO) and compression (CO) of frames f:

1. $N_{PB}=F-1, N_B=0$.
   DO: IPPPP, ..., P≅1, 2, 3, 4, 5 ..., F.
   CO: IPPPP, ..., P≅1, 2, 3, 4, 5 ..., F.
   In this case DO and CO are the same. The first frame is an I-frame and remaining frames are P-frames. The CO shows that P-frames f are predicted one-directionally based on a previous already encoded reference frame f'=f−1, which is always either an I-frame or a P-frame.
2. $N_{PB}=F-1, N_B=1$:
   DO: IBPBP, ..., BP≅1, 2, 3, 4, 5, ..., F−1, F.
   CO: IPBPB, ..., PB≅1, 3, 2, 5, 4 ..., F, F−1.
   DO and CO are different. The first frame is an I-frame, remaining odd frames are P-frames, and even frames are B-frames. The selected CO allows a bi-directional prediction of even frames based on two neighboring already encoded P-frames, e.g. frame f=4 is predicted based on reference frames $f_1^r=f+1=5$ and $f_2^r=f-1=3$.

Compression orders for other parameters $N_{PB} \geq 0$, $N_B \geq 0$ can be simply deduced as shown in FIG. 4. In this figure, from top to bottom, a hierarchical compression order for B-frames is defined based on dyadic sub-sampling. In certain cases, the reference frames for coding a B-frame may both be temporally prior or past the current B-frame.

After specifying a frame compression order, vertex locations of each frame are encoded. Without loss of generality we assume that frame f has to be encoded. First, all vertex locations of frame f are loaded into Vertex Location Memory, see FIG. 2. The vertex locations of frame f are identified by VLF in FIG. 2, the Vertex Location Memory is identified by VLM in FIG. 2. Subsequently, the Layer Compression Controller obtains information from the Layer Designer defining the following vertex order $v \in \mathcal{V}_1 \ldots, v \in \mathcal{V}_i, \ldots, v \in \mathcal{V}_L$.

The Layer Compression Controller is identified by LCC in FIG. 2.

Thus, vertex locations $p_v^f$ of frame f are conducted to the DPCM Encoder starting with all vertex locations of the base layer $\mathcal{V}_1$ and ending with all vertex locations of the highest layer $\mathcal{V}_L$. The DPCM Encoder is identified by DPCMENC in FIG. 2. The vertex order within a layer $V_l$ is defined applying a deterministic algorithm exploiting $\mathcal{V}_l$ and connectivity $\mathcal{K}_l$. Based on the previously determined frame compression type for frame f, i.e. I-, P-, or B-frame, and determined reference frames, and based on layer $\mathcal{V}_l$ and connectivity $\mathcal{K}_l$, the Layer Compression Controller selects an appropriate predictor for predicting $p_v^f$ in the DPCM Encoder. Subsequently, location $p_v^f$ is predictively encoded in the DPCM Encoder removing the redundancies between the current vertex location and already encoded locations. FIG. 3 shows a block diagram of a DPCM Encoder, identified by DPCMENC, for vertex locations. Here, the DPCM Encoder component is an ordinary DPCM encoder, extended with an input for selecting a predictor for each location being encoded, see FIG. 3. The predictor is selected from a set of predictors, identified by SOP in FIG. 3. A Vertex Location Memory is identified by VLM in FIG. 3. The Vertex Location Memory in FIG. 3 can be the same as the Vertex Location Memory in FIG. 2 or they can be different blocks. Finally, left-over residuals $r_v^f$ are entropy encoded removing remaining statistical dependencies.

The corresponding scalable decoder, see FIG. 5, is obtained simply by substituting the Connectivity Encoder and DPCM Encoder component of the scalable encoder, see FIG. 2, with the corresponding components Connectivity Decoder (Touma and Gotsman, in "Triangle mesh compression," in Proceedings of Graphics Interface Conference, Vancouver, Canada, 1998) and DPCM Decoder. The block diagram of the DPCM Decoder is shown in FIG. 6. In FIG. 6, the DPCM Decoder is identified by DPCMDEC, the set of predictors is identified by SOP, and a Vertex Location Memory is identified by VLM. All other components of the scalable encoder remain unchanged in the scalable decoder. In FIG. 5 the scalable decoder is shown. In FIG. 5, the scalable decoder is identified by SDEC, the Connectivity Decoder is identified by CDEC, and the DPCM Decoder is identified by DPCMDEC. Further reference numerals in FIG. 5 identify components or elements that correspond to the components or elements identified by the same reference numerals in FIG. 2, i.e. 3DMS identifies a 3D Mesh Sequence component, VLM identifies a Vertex Location Memory, LD identifies a Layer Designer, LCC identifies a Layer Compression Controller, FOC identifies a Frame Order Controller, VLF identifies vertex locations for frame f, RF identifies reference frames, and IF, PF, and BF identify I-frames, P-frames, and B-frames, respectively. During decoding first connectivity K is decoded, which is saved in the 3D Mesh Sequence component. Subsequently, it is used in the Layer Designer in order to determine layers $V_l$ and corresponding connectivities $\mathcal{K}_l$.

Hence, having as input a residual $r_v^f$, the Layer Compression Controller selects the same predictor, which was applied during encoding location $p_v^f$ with the scalable encoder. The Layer Compression Controller is identified by LCC in FIG. 5. This predictor is used in the DPCM Decoder in order to obtain the decoded location $\bar{p}_v^f$. Finally, the Layer Compression Controller determines the vertex v of the currently decoded vertex location $\bar{p}_v^f$, associating $\bar{p}_v^f$ to vertex v in frame f.

In the following subsections, we describe a realization of the component Layer Designer, define the set of predictors employed in the DPCM Encoder and DPCM Decoder and define rules for predictor selection, which are used in the Layer Compression Controller. At the end we explain the applied entropy coding to residuals $r_v^f$.

Layer Designer

Layers, i.e. disjoint sets $\mathcal{V}_l$ and associated connectivities $\mathcal{K}_l$, are defined by employing mesh simplification techniques. A deterministic mesh simplification algorithm is applied exploiting only mesh connectivity $\mathcal{K}$. Hence, no additional side information is needed for describing $\mathcal{V}_l$ and $\mathcal{K}_l$, since connectivity $\mathcal{K}$ is known at the decoder side just from the beginning of the compression process.

The basic simplification operation used in this algorithm is based on patches. A degree-d patch is set of triangles incident to a vertex of valence d. In FIG. 7a a gray shaded degree-6 patch is presented. The numbers 5 to 7 in FIG. 7a depict vertex valences and are not supposed to be reference numerals. The employed simplification algorithm consists of two major steps: Patch Decomposition and Simplification.

Decomposition into Patches

Mesh connectivity is first decomposed into patches using a deterministic patch-based region-grow traversal algorithm conquering only patches of degree ≦6, see FIG. 8. In FIG. 8 gray shaded triangles are part of patches, while white triangles are not. For clarity, triangles that are part of patches are also marked with a letter a, c, or e. Decomposition starts with an arbitrarily selected initial seed patch of degree ≦6 by marking it as not conquered and enqueueing it into a FIFO. In the traversal loop, the first patch is dequeued from the FIFO. If this patch is already marked as conquered it is skipped an the loop starts from the beginning. If it is not yet conquered, it is marked as conquered, its middle vertex $w_k$ is saved, and all neighboring patches of degree $\leq 6$ are enqueued into the FIFO.

Here neighboring patches are patches which have only one common edge with the current patch. This procedure is iterated until the FIFO is empty. As output we obtain a series of M patches, see FIG. 8, described by their middle vertices $w_1 \ldots, w_k, \ldots, w_M$. Subsequent simplification is performed only to these patches.

Patch Based Simplification

Figure 7B:
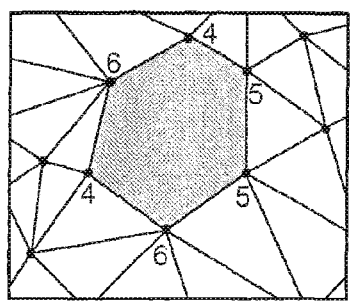
Figure 7C:
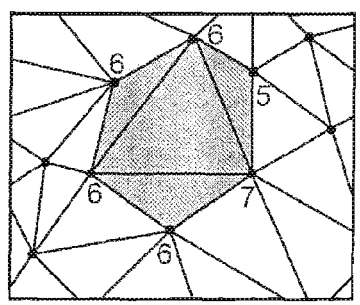

All patches obtained during patch decomposition are traversed again in the order they were conquered. The middle vertex $w_k$ of each patch is removed and the remaining polygon is re-triangulated, see FIGS. 7a, 7b, 7c. The numbers 5 to 7 in FIGS. 7a and 4 to 6 in FIGS. 7b and 6 to 7 in FIG. 7c depict vertex valences and are not supposed to be reference numerals. The number of different triangulations $T_d$ for a degree-d patch depends on d, i.e. there are $T_3=1$, $T_4=2$, $T_5=5$, $T_6=14$ triangulations (Sedgewick and Flajolet, in "An Introduction to the Analysis of Algorithms," Addison-Wesley, 1996). We define the set of all triangulations of a degree-d patch as $\mathcal{T}_d := \{1, \ldots, T_d\}$, see FIG. 9. The numbers 1 to 14 for $T_6$ and 1 to 5 for $T_5$ and 1 to 2 for $T_4$ in FIG. 9 depict the number of different triangulations and are not supposed to be reference numerals.

In order to select one triangulation $t \in \mathcal{T}_d$ for a degree-d patch after removing its middle vertex $w_k$ we apply a measure Dev $\mathcal{K}_{i\,(wk)}$, t). It measures the average absolute deviation of all valences of vertices in $\mathcal{N}_{\mathcal{K}_i}(w_k)$ from the valence 6 with respect to connectivity $\mathcal{K}_i$:

$$Dev_{K_i}(w_k, t) := \frac{1}{|N_{K_i}(w_k)|} \sum_{v' \in N_{K_i}(w_k)} |val_{K_i}^{w_k}(v', t) - 6|.$$

Here $val_{\mathcal{K}_i}^{w_k}(v',t)$ denotes the valence of vertex v' after removing the middle vertex $w_k$ and re-triangulating the remaining polygon using triangulation t with respect to connectivity $\mathcal{K}_i$. Note that different triangulations can lead to different deviations, since valences of vertices v' change depending on the triangulation t. We select that triangulation t for re-triangulating a patch which leads to the smallest deviation Dev $\mathcal{K}_i$ ($w_k$,t). Overall, this kind of selection reduces the absolute deviation of valences from valence 6. Hence, it prevents the creation of vertices with large valences, which usually lead to long narrow triangles. Furthermore, large vertex valences would also lead to many valence 3 vertices, which can not be predicted accurately later on.

From Simplification to Layers

The set of all vertices $\mathcal{V}$ is decomposed in L disjoint subsets $\mathcal{V}_i$ with associated connectivities $\mathcal{K}_i$ by recursively applying the procedures described in the last two sections to the simplified connectivity. First, patch decomposition and simplification is applied to the connectivity $\mathcal{K}_L := \mathcal{K}$ consisting of vertices in $\mathcal{V}$. Thus, a set of $M_L$ vertices $\mathcal{V}_L := \{w_1^L, \ldots, w_{M_L}^L\}$ is removed and a simplified connectivity $\mathcal{K}_{L-1}$ consisting of vertices in $\mathcal{V} \setminus \mathcal{V}_L$ remains. Recursively applying this procedure to the simplified connectivity we obtain for each $l=L, \ldots, 2$ a set of vertices $\mathcal{V}_l = \{w_1^l, \ldots, w_{M_l}^l\}$ and a simplified connectivity $\mathcal{K}_{l-1}$ consisting of vertices $\mathcal{V} \setminus \cup_{k=l}^L \mathcal{V}_k$. At last, we define the base layer as the remaining set of vertices $\mathcal{V}_1 = \mathcal{V} \setminus \cup_{k=2}^L \mathcal{V}_k$ with connectivity $\mathcal{K}_1$. Hence, we obtain a layered decomposition of vertices in $\mathcal{V}$ and connectivity $\mathcal{K}$ in L layers $\mathcal{V}_l$ and connectivities $\mathcal{K}_l$ for $l = 1, \ldots, L$.

Patch based simplification guarantees that the neighbors of each vertex are located one layer below, i.e. for each vertex $v \in \mathcal{V}_l$ for $l=2, \ldots, L$ we have $$\mathcal{N}_{\mathcal{K}_l}(v) \subset \mathcal{V}_{l-1}. \quad \text{(Equ. 1)}$$

This is a key property of this layered decomposition providing a configuration of interleaving vertices between consecutive layers. Later in this description it will be shown that this property allows a robust exploitation of inter layer dependencies of vertex locations $p_v^f$ in space and time.

Predictors

According to the vertex order determined by the Layer Compression Controller, vertex locations within one frame f are encoded layer-wise, i.e. all locations $p_v^f$ with $v \in \cup_{k=1}^{l-1} \mathcal{V}_k$ are encoded before encoding $p_v^f$ with $v \in \mathcal{V}_l$. Consequently, when encoding a location $p_v^f$ with $v \in \mathcal{V}_l$, $l>1$, all neighboring vertex locations $p_{v'}^f$ with $v' \in \mathcal{N}_{\mathcal{K}_l}(v) \subset \mathcal{V}_{l-1}$ are already encoded (see Equation 1). This property allows the definition of predictors, which exploit the whole spatial or spatio-temporal 1-ring neighborhood of a vertex location.

Based on the type of the current frame f, i.e. I-, P-, or B-frame, and possibly based on reference frame f' or reference frames $f_1^r$ and $f_2^r$, which depends on that if f is a P- or B-frame, and depend on the set of neighboring vertices $\mathcal{N}_{\mathcal{K}_l}(v)$ an appropriate predictor is selected in the DPCM Encoder.

For convenience, we first define two functions. Let $P^c(f,v)$ denote the set of already encoded vertex locations $\bar{p}_{v'}^f$, which are saved in the Vertex Location Memory of the DPCM Encoder just before encoding $p_v^f$. Hence, if location $p_{v'}^f$ is encoded before $p_v^f$, than its encoded counterpart satisfies $\bar{p}_{v'}^f \in P_c(f,v)$. Furthermore, let $$P_{N_{K_l}}^c(f, v) := \{\bar{p}_{v'}^f \in P^c(f, v) \,|\, v' \in N_{K_l}(v)\}$$

be the set of encoded vertex locations $\bar{p}_{v'}^f$ of frame f, whose corresponding vertices v' are in the 1-ring neighborhood of vertex v with respect to connectivity $K_l$. The sets of vertex locations $P_{\mathcal{N}_{\mathcal{K}_l}}^c(f,v)$, and potentially also $P_{\mathcal{N}_{\mathcal{K}_l}}^c(f',v)$ or $P_{\mathcal{N}_{\mathcal{K}_l}}^c(f_1^r,v)$ and $P_{\mathcal{N}_{\mathcal{K}_l}}^c(f_2^r,v)$ are determined in the DPCM Encoder using $\mathcal{N}_{\mathcal{K}_l}$ and reference frame numbers f' or $f_1^r$ and $f_2^r$ as input from the Layer Compression Controller. This sets determine encoded vertex locations which are used for prediction of location $p_v^f$. In the following, we will use the abbreviated notation $P_{\mathcal{N}_{\mathcal{K}_l}}^c$ instead of $P_{\mathcal{N}_{\mathcal{K}_l}}^c(\cdot,\cdot)$, since the considered frame f and vertex v will be known from the context.

Now, we define two sets of adaptive predictors, a set of linear and a set of non-linear predictors, which are utilizable in the DPCM Encoder and DPCM Decoder. Predictors are adapted to the type of the current frame f and the set of encoded vertex locations of the neighborhood $P_{\mathcal{N}_{\mathcal{K}_l}}^c$. Without loss of generality, in the following we assume that location $p_v^f$ with $v \in V_l$ has to be predicted.

Set of Linear Predictors
I-frame predictor:

$$pred_{lin}^I(f, v) := \begin{cases} (0, 0, 0)^T & P_{\mathcal{N}_{\mathcal{K}_l}}^c = \emptyset \\ \dfrac{1}{|P_{\mathcal{N}_{\mathcal{K}_l}}^c|} \sum_{\bar{p} \in P_{\mathcal{N}_{\mathcal{K}_l}}^c} \bar{p} & P_{\mathcal{N}_{\mathcal{K}_l}}^c \neq \emptyset. \end{cases}$$

Predictor $pred_{lin}^I(f,v)$ predicts $p_v^f$ calculating the average of already encoded 1-ring neighbors in the same frame f. We want to emphasize that for l>1 always all vertex locations in the 1-ring neighborhood of a vertex are encoded. Thus, then the predicted location corresponds to the barycenter of vertex v in frame f with respect to connectivity $\mathcal{K}_l$.

P-frame predictor:

$$pred_{lin}^P(f, v, f^r) := \bar{p}_v^{f^r} + \underbrace{pred_{lin}^I(f, v) - pred_{lin}^I(f^r, v)}_{\text{an averaged motion vector}}.$$

Predictor $prec_{lin}^P(f,v)$ predicts $p_v^f$ based on averaging motion vectors of already encoded neighboring vertex locations, see FIG. 10.

B-frame predictor:

$$pred_{lin}^B(f, v, f_1^r, f_2^r) := \frac{1}{2}(pred_{lin}^P(f, v, f_1^r) + pred_{lin}^P(f, v, f_2^r)).$$

During B-frame prediction the average of two P-frame predictions is calculated, one using locations of frames $f_1^r$ and f, and another one using locations of frames $f_2^r$ and f.

Hence, for prediction of location $p_v^f$ a predictor is selected based on the type of frame f, i.e. $pred_{lin}^I$, $pred_{lin}^P$, or $pred_{lin}^B$. Thereupon, using $\mathcal{N}_{\mathcal{K}_l}$ potentially $f^r$ or $f_1^r$ and $f_2^r$ encoded vertex locations are determined, which are exploited by the selected predictor for prediction. Finally, a predicted location $\hat{p}_v^f$ is obtained.

Predictors presented so far, were linear predictors exploiting dependencies of first order for prediction. In the following we introduce a set of non-linear predictors, also utilizable in the DPCM Encoder and DPCM Decoder, which are able to exploit dependencies of second order, too. These predictors can be used as an alternative to the presented set of linear predictors.

Set of Non-Linear Predictors
I-frame predictor:

$pred_{nl}^I(f,v) := pred_{lin}^I(f,v)$.

$pred_{nl}^I(f,v)$ is in fact a linear predictor, but just for the sake of completeness we declare it with the subscript nl (non-linear).

P-frame predictor:
Let $A(f,v,f^r) \in R^{3 \times 3}$ be an orthonormal matrix calculated depending on $P_{\mathcal{N}_{\mathcal{K}_l}}^c(f,v)$ and $P_{\mathcal{N}_{\mathcal{K}_l}}^c(f^r,v)$. We define $pred_{nl}^P(f,v,f^r) := pred_{nl}^I(f,v) + A(f,v,f^r) \cdot (\bar{p}_v^{f^r} - pred_{nl}^I(f^r,v))$.

FIG. 11 illustrates the calculation of $pred_{nl}^P(f,v,f^r)$. Matrix $A(f,v,f^r)$ is determined in such a manner that the spatial relationship of vertex location $\bar{p}_v^f$ to locations in $P_{\mathcal{N}_{\mathcal{K}_l}}^c(f^r,v)$ is preserved in frame f when considering the predicted location $pred_{nl}^P(f,v,f^r)$ and locations in $P_{\mathcal{N}_{\mathcal{K}_l}}^c(f,v)$. $A(f,v,f^r)$ is calculated using local orthonormal coordinate frames $M^f = (\vec{x}^f, \vec{y}^f, \vec{z}^f)$ and $M^{f'} = (\vec{x}^{f'}, \vec{y}^{f'}, \vec{z}^{f'})$, which are attached at the corresponding patch barycenters $pred_{nl}^I(f^r,v)$ and $pred_{nl}^I(f,v)$, respectively, see FIG. 11.

Basis vectors $\vec{z}^f$ and $\vec{z}^{f'}$ are calculated as normal vectors of regression planes, which are spanned through locations in $P_{\mathcal{N}_{\mathcal{K}_l}}^c(f,v)$ and $P_{\mathcal{N}_{\mathcal{K}_l}}^c(fr,v)$, respectively. Basis vector $\vec{x}^f$ if is calculated by orthogonal projection of $\bar{p}_{v'}^f - pred_{nl}^I(f,v)$ with $v' := \min(\mathcal{N}_{\mathcal{K}_l}(v))$ into the plane spanned by normal vector $\vec{z}^f$. Subsequently it is normalized to unit length. Basis vector $\vec{x}^{f'}$ is determined in the same manner in frame $f^r$. Consequently, we have $\vec{y}^f = \vec{z}^f \times \vec{x}^f$ and $\vec{y}^{f'} = \vec{z}^{f'} \times \vec{x}^{f'}$. Finally, we determine matrix $A(f,v,f^r)$ according to $$A(f,v,f^r) := M^f \cdot (M^{f'})^T.$$

Note that $M^f$ and $M^{f'}$ are orthonormal matrices calculated by second order products using only encoded vertex locations of the spatio-temporal neighborhood of $p_v^f$. Thus, matrix $A(f,v,f^r)$ is also a orthonormal matrix exploiting inter frame and inter layer dependencies of second order.

Previously mentioned basis vectors $\vec{z}^f$ and $\vec{z}^{f'}$ can also be calculated as the averages of face normals of appropriately defined faces. This face normals based method is much faster than the recommended regression method but leads to inferior prediction accuracy.

B-frame predictor:
Analogous to the linear predictor $pred_{lin}^B(f,v,f_1^r,f_2^r)$ we define $$pred_{nl}^B(f, v, f_1^r, f_2^r) := \frac{1}{2}(pred_{nl}^P(f, v, f_1^r) + pred_{nl}^P(f, v, f_2^r)).$$

Quantization and Entropy Coding
In the DPCM Encoder prediction errors $\delta_v^f = p_v^f - \hat{p}_v^f$ are uniformly quantized using a quantization bin size A. Quantization leads to integer valued 3D vectors $$r_v^f = \begin{pmatrix} i_{v,1}^f \\ i_{v,2}^f \\ i_{v,3}^f \end{pmatrix}.$$

Subsequent entropy coding exploits remaining statistical dependencies for further compression. Entropy coding is applied to each component separately. We apply an adaptive order-0 arithmetic coder combined with Golomb codes (Moffat et al., in "Arithmetic coding revisited," ACM Transactions on Information Systems, Vol. 16, No. 3, 1998, and Sayood, in "Introduction to Data Compression," Morgan Kaufmann, 1996) for entropy coding.

Arithmetic coding is applied to all integer values laying in a predefined domain of integer values $A := [-i_{max}, i_{max}] \cap Z$, while values outside of this domain are encoded using Golomb codes. We use $i_{max} = 3$. If a value i is contained in A and $|i| \neq i_{max}$, than it is encoded applying arithmetic coding. We denote these values with $i_a$. If a value i is outside of A or $|i| = i_{max}$, than i is decomposed in two parts. If $i \geq i_{max}$, we define $i_a := i_{max}$ and $i_g := i - i_a$, and, if $i \leq -i_{max}$, we define $i_a :=$ −

$i_{max}$ and $i_g:=i_a-i$. Subsequently, $i_a$ is encoded using the arithmetic coder, while $i_g$ is encoded using Golomb codes.

Separate entropy coders are employed for encoding residuals $r_v^f$ of each layer l, adapting arithmetic coders layer-wise to statistical distributions of residuals, which are obtained while encoding previous frames. For each layer in each frame first arithmetically encoded values $i_a$ are written to the bit-stream and thereafter Golomb encoded values $i_g$ are written to the bit-stream.

During decoding, first all values of the arithmetically encoded part $i_a$ are decoded. Thereafter, all Golomb encoded values $i_g$ are decoded. Finally, if $i_a \in A$ and $|i| \neq i_{max}$, than the decoded integer value is $i:=i_a$. If a value $i_a$ is equal to $i_{max}$, than it is added to the corresponding $i_g$ value, leading to the decoded value $i:=i_a+i_g$. Accordingly, if $i_a$ is equal to $-i_{max}$, we determine $i:=i_a-i_g$. In the end, all residuals are decoded.

Parameters

In order to produce a decodable bit-stream besides encoded connectivity and entropy encoded residuals a set of parameters in encoded, providing that parameters to the decoder which were applied while encoding. The following parameters are encoded once in the beginning of the compression process:

Number of layers L,
Quantization bin size $\Delta$,
Frame Order Controller parameters $N_{PB}$ and $N_B$.

In order to specify for each layer in each frame which set of predictors is applied, i.e. the set of linear or non-linear predictors, one additional bit of side information is encoded per layer and frame just before encoding residuals of that layer in that frame. Thus, L bits of side information are encoded per frame in order to specify predictors. If the coder is extended to use more than two sets of predictors, than more bits of side information have to be encoded to specify the applied set of predictors.

Evaluation and Results

We evaluate the compression performance of the presented coder using four different parameter settings:

SLPC1, a coder using exclusively the set of linear predictors and encoding frames in an order defined by $N_{PB}$=F−1, $N_B$=0.
SLPC2, a coder using exclusively the set of linear predictors and encoding frames in an order defined by $N_{PB}$=F−1, $N_B$=1.
SCPC1, a coder employing linear and non-linear predictors and encoding frames in an order defined by $N_{PB}$=F−1, $N_B$=0.
SCPC2, a coder employing linear and non-linear predictors and encoding frames in an order defined by $N_{PB}$=F−1, $N_B$=1.

SCPC1 and SCPC2 are realized by selecting in each layer/ of each frame f that set of predictors, i.e. that set of linear or non-linear predictors, which leads to the lowest average prediction error.

For experimental evaluation, we used the time-consistent mesh sequences Chicken consisting of 400 frames and 3030 vertices per frame and Cow consisting of 204 frames and 2904 vertices per frame. Evaluation with other mesh sequences led to comparable results.

As result of the layered representation of connectivity, we obtain time-consistent mesh sequences in different spatial resolutions, see FIG. 1. The connectivities of the sequences Chicken and Cow were decomposed in 8 and 6 layers respectively. Each time a new layer is added, the number of vertices is increased by about 38%, see Table 1, i.e. spatial resolution increases with a nearly constant factor.

TABLE 1

Number of vertices $M_l$ per layer $l$ and percentage of increased spatial resolution per new layer.

| | Chicken | | Cow | |
|---|---|---|---|---|
| $l$ | $M_l$ | $M_l / \sum_{k=1}^{l-1} M_k$ | $M_l$ | $M_l / \sum_{k=1}^{l-1} M_k$ |
| 1 | 318 | ∞ | 593 | ∞ |
| 2 | 103 | 32.4% | 225 | 37.9% |
| 3 | 166 | 39.4% | 290 | 35.5% |
| 4 | 221 | 37.6% | 423 | 38.2% |
| 5 | 299 | 37.0% | 554 | 36.2% |
| 6 | 442 | 39.9% | 819 | 39.3% |
| 7 | 600 | 38.7% | — | — |
| 8 | 881 | 41.0% | — | — |
| Σ | 3030 | | 2904 | |

The quality of encoded vertex locations is measured relative to corresponding original vertex locations using a normalized vertex-wise $L_2$ norm (Karni and Gotsman, in "Compression of soft-body animation sequences," Computer & Graphics, Vol. 28, No. 1, 2004). We denote it here as KG error. Bit rate is measured in bits per vertex and frame (bpvf). In order to allow a comparison with other approaches using this measure, all vertex locations, i.e. all L layers per frame, are encoded. Before entropy coding, prediction errors are quantized uniformly in each spatial direction using a predefined quantization bin size A. Operational rate-distortion curves shown in FIG. 12 and FIG. 13 were produced by varying A.

In FIG. 12 and FIG. 13 the proposed scalable coders with four different settings (SLPC1, SLPC2, SCPC1, SCPC2) were evaluated against state-of-the-art compression algorithms. FIG. 12 illustrates the sequence Chicken encoded using l=8 layers, FIG. 13 illustrates the sequence Cow encoded using l=6 layers. Due to the usage of different error measures we were not able to compare against all algorithms mentioned above. We compared against the wavelet based approaches of Payan and Antonioni (TWC) (Payan and Antonioni, in "Temporal wavelet-based geometry coder for 3D animations," Computer & Graphics, Vol. 31, No. 1, 2007) and Guskov and Khodakovsky (AWC) (Guskov and Khodakovsky, in "Wavelet compression of parametrically coherent mesh sequences," in Proceedings of ACM/EG Symposium on Computer Animation, Grenoble, France, 2004), and the PCA-based approach of Sattler et al. (CPCA) (Sattler et al., in "Simple and efficient compression of animation sequences," in Proceedings of ACM/EG Symposium on Computer Animation, Los Angeles, Calif., USA, 2005).

The presented scalable coder with all four parameter settings SLPC1, SLPC2, SCPC1, and SCPC2 outperforms all other approaches. Note that an error of 0.02 for Chicken and 0.15 for Cow can be regarded as lossless with regard to visual quality. In this domain wavelet and PCA based approaches are outperformed significantly. Obviously, a layered configuration of interleaving vertices and an selective predictive exploitation of linear and non-linear dependencies increases the coding efficiency of predictive coding approaches. SCPC1 achieves gains in bit-rate of about 13% compared to SLPC1, while SCPC2 achieves even higher gains of over 15% compared to SLPC2. Thus, an additional exploitation of non-linear dependencies leads to significant gains in domains relevant for applications. SLPC2 shows better compression performance than SLPC1. This has to be attributed to an increased predictor robustness against quantization errors, i.e. an increased prediction accuracy, due to bi-directional prediction. Overall, layered exploitation of non-linear dependencies leads to additional gains in bit-rate providing the feature of layered decoding without any additional costs in bit-rate.

Applications

The proposed method is applicable for redundancy reduction in signals. Considered signals are described as follows:

A signal is described as a sequence of frames. Each frame is described in terms of connectivity and geometry. Connectivity is described in terms of nodes or vertices, edges and faces. Geometry is described in terms of locations, points, or vectors of fixed dimension. The sequence of frames fulfils one of the following conditions:
1. All frames have identical connectivity but geometry can change from frame to frame.
2. Frames can be grouped in blocks of frames with all frames within a block having identical connectivity. Between different blocks connectivities can be different.

In case 1 the coder can be directly applied to the sequence of frames. Timeconsistent 3D mesh sequences satisfy condition 1. In case 1 the coder can be applied block-wise, encoding for each block of frames first connectivity and then geometry.

A multi-channel signal with each single channel signal being a sequence of locations, points, or vectors of fixed dimension. Inter-channel dependencies are described in terms of connectivity. Connectivity is described in terms of nodes or vertices, edges and faces.

The proposed method produces a structured bit-stream representing the encoded signal, which allows for progressive decoding with successively increasing levels of detail, i.e. increasing spatial and/or temporal resolution. Amongst others the method is applicable to following signals: time-consistent sequences of 3D meshes (or wireframes), time-consistent sequences of texture coordinates, or time-consistent sequences of normal vectors. This sequences are usually represented by means of the IndexedFaceSet and CoordinateInterpolator node, as defined in VRML97 or MPEG-BIFS.

Possible Extensions

Amongst others the following extensions are applicable in order to increase the compression efficiency of the method and the smoothness of the method's layered decomposition:

Calculation of a layered decomposition $\mathcal{V}_l, \mathcal{K}_l$ for l=1, ..., L exploiting connectivity $\mathcal{K}$ and all vertex locations $p_v^f$ for $v \in \mathcal{V}$ and f=1 ..., F instead of exploiting only connectivity $\mathcal{K}$. In this case, the layered decomposition $\mathcal{V}_l, \mathcal{K}_l$ for l=1, ..., L is encoded instead of $\mathcal{K}$.

Application of I- and P-frames and transform coding for compression. This can be realized by grouping of frames in the manner $$I, Block_1, P, Block_2, P, Block_3, P,$$

Blocks like $Block_i$ refer here to a set of frames.

I- and P-frames are encoded with the presented coder. Subsequently, each block $Block_i$ is predicted using already encoded surrounding I- and/or Pframes. Finally, remaining prediction errors are decorrelated using transform coding and entropy encoded.

Determination of optimal reference frames in order to improve prediction accuracy. Reference frame numbers are encoded subsequently as side information.

The proposed method can be extended in order to realize View-Dependent compression of time-consistent mesh sequences.

View-Dependant compression stands for compression of only that vertex locations which are visible from a single view. Here, the view can be either fixed or it can change with each frame. View-Dependant compression can improve the compression performance significantly, since only a subset of vertex locations has to be encoded per frame. View-Dependant compression has to be preformed on demand, i.e. via a back-channel the decoder has to notify the encoder or a server which view is currently active. Subsequently, the encoder encodes or a server sends only that subset of vertex locations of the current frame, which are currently visible. This can also be a superset of vertex locations including currently not visible vertices. In order to encode a subset of vertex locations per frame, the coder is extended as follows:

Firstly, the first frame is encoded as an I-frame encoding all vertex locations of that frame. For subsequent frames, a bitmask, which denotes for each vertex if its associated location has to be encoded or not, is first encoded. This defines the subset of vertex locations to be encoded for a certain frame. Thereafter, the first frame may be transformed using an affine transformation in order to match the current frame as closely as possible, and transform coefficients, describing this affine transform, are encoded. Finally, an extended version of the proposed method is applied for compression of the subset of vertex locations.

In general reference frames will not contain all vertex location of the spatial and/or temporal neighborhood of the currently encoded vertex location. This is due to the fact that only a subset of vertex locations is encoded per frame. Therefore, the method is extended to use always the transformed version of the first frame as additional reference frame. Since all vertex locations of the first frame are encoded, missing neighboring vertex locations can be provided at the encoder and decoder by the transformed first frame.

CONCLUSION

We present a method for predictive compression of time-consistent 3D mesh sequences supporting and exploiting scalability. The applied method decomposes each frame of a mesh sequence in layers, which provides a time-consistent multi-resolution representation. Following the predictive coding paradigm, local temporal and spatial dependencies between layers and frames are exploited for layer-wise compression. Prediction is performed vertex-wise from coarse to fine layers exploiting the motion of already encoded neighboring vertices for prediction of the current vertex location. Consequently, successive layer-wise decoding allows to reconstruct frames with increasing levels of detail.

It is shown that a predictive exploitation of the proposed layered configuration of vertices can improve the compression performance upon other state-of-the-art approaches in domains relevant for applications.

We presented a method for layered predictive coding of time-consistent 3D mesh sequences. Layers were defined by employing patch-based mesh simplification techniques and a layer-wise predictor selection was applied in order to exploit linear and non-linear spatio-temporal dependencies between layers and frames. We experimentally showed that a layered configuration of vertices improves the exploitation of spatio-temporal dependencies. The proposed method outperforms state-of-the-art approaches in domains relevant for applications. Furthermore, it can be used for frame-based layer-wise decoding and it is applicable for real-time compression due to its low computational cost (linear run-time in the number of vertices).

The priority document is incorporated in this application by reference and is in particular to be considered to eventually correct any errors occurring.

The invention claimed is:

1. A method for encoding a time-consistent 3D mesh sequence using scalable predictive coding, the method comprising:

receiving successive frames of a 3D mesh sequence, wherein a frame comprises a set of vertices (V) with associated connectivity (K) and wherein the connectivity (K) is identical for all frames of the 3D mesh sequence, decomposing the 3D mesh sequence into a multi-resolution representation comprising two or more spatial layers represented by disjoint sets of vertices ($V_l$) with associated connectivities ($K_l$), wherein the decomposing the 3D mesh sequence into a multi-resolution representation includes:

setting a number of layers (L) for decomposition, encoding the set number of layers (L) for the decomposition, selecting one or more patches comprising sets of triangles having one middle vertex in common, the middle vertex having a valence not more than a predefined number, in particular not more than 6, the valence being defined by the number of direct neighbour vertices of said middle vertex, removing the middle vertices of said one or more selected patches and generating a decomposed layer ($V_L$) defined by said removed middle vertices with associated connectivity ($K_L$), determining a simplified connectivity associated to the remaining set of vertices, wherein the determining the simplified connectivity associated to the remaining set of vertices includes triangulating the vertices of the former 1-ring neighborhood of a removed vertex, wherein the 1-ring neighborhood is defined by all vertices being a direct neighbour of a vertex, wherein a triangulation is selected based on an average absolute deviation of the valences of the vertices of the 1-ring neighborhood of the removed vertex from a valence equal to a predefined number, in particular equal to 6 with respect to the triangulation and the connectivity ($K_l$) associated to the layer, repeating the selecting one or more patches, the removing the middle vertices, and the determining a simplified connectivity for a number of iterations (L-2) being by 2 less than the number of set layers on the respective remaining sets of vertices with associated simplified connectivities to generate decomposed layers ($V_{L-1}$, ..., $V_2$) with associated connectivities ($K_{L-1}$, ..., $K_2$), and defining the remaining set of vertices ($V_1$) associated connectivity ($K_1$) as a base layer, and encoding the vertices of the layers using a predictive encoder, wherein the decomposition is calculated from the connectivity (K) of the 3D mesh sequence irrespectively of location data of the vertices, and wherein the encoding the vertices of the layers using a predictive encoder includes:

selecting a compression method for each frame being selected of the group comprising of: an I-frame compression and a P-frame compression and/or a B-frame compression, and generating a prediction error using an I-frame predictor a P-frame predictor, or a B-frame predictor respectively, wherein the P-frame compression includes, for a current vertex of a current frame, considering an already encoded frame as a reference frame, calculating P-frame predictor by adding up an I-frame predictor of the current vertex of the current frame and the difference of the location of the current vertex in the reference frame and an I-frame predictor of the current vertex of the reference frame respectively, whereby said difference is multiplied by a Rotation Matrix (A).

2. The method according to claim 1, further comprising:
encoding the connectivity (K) of the 3D mesh sequence for a first frame of the sequence, and
selecting for each frame a compression method from a group of compression methods comprising I-frame compression and P-frame compression and/or B-frame compression.

3. The method according to claim 1 or 2, wherein a the B-frame compression includes, for a current vertex of a current frame, considering two already encoded frames as a first reference frame and second reference frame respectively, calculating a B-frame predictor by calculating an average, in particular a weighted average of a P-frame predictor considering the first reference frame and a P-frame predictor considering the second reference frame.

4. The method according to claim 1 or 2, wherein an information for specifying the chosen predictor is encoded whereby the predictor is encoded frame-wise or layer-wise, in particular using a fixed number of bits.

5. An encoding device for encoding a time-consistent 3D mesh sequence adapted for carrying out the method of claim 1.

6. A method for decoding a data signal representing an encoded time-consistent 3D mesh sequence defined by frames, each frame comprises a set of vertices (V) with associated connectivity (K) and wherein the connectivity (K) is identical for all frames of the 3D mesh sequence, encoded by using scalable predictive coding, the method:

receiving the data signal, decoding the connectivity (K) of the 3D mesh sequence, decomposing the 3D mesh sequence into a multi-resolution representation comprising two or more spatial layers represented by disjoint sets of vertices ($V_l$) with associated connectivities ($K_l$), decoding the vertices of the layers using a predictive decoder, wherein the decomposition is calculated from the connectivity (K) of the 3D mesh sequence irrespectively of location data of the vertices, decoding for each frame and/or for each layer information specifying a compression method as used by the coder, in particular decoding reference frame numbers representing the numbers of reference frames and decoding the type of compression method comprising I-frame compression and P-frame compression and/or B-frame compression, wherein decomposing the 3D mesh sequence into a multi-resolution representation includes:

decoding a layer number representing the number of layers (L) as received from a coder, selecting one or more patches comprising sets of triangles having one middle vertex in common, the middle vertex having a valence not more than a predefined number, in particular not more than 6, the valence being defined by the number of direct neighbour vertices of said middle vertex, removing the middle vertices of said one or more selected patches and generating a decomposed layer ($V_L$) defined by said removed middle vertices with associated connectivity ($K_L$), determining a simplified connectivity associated to the remaining set of vertices, repeating the selecting one or more patches, the removing the middle vertices, and the determining a simplified connectivity for a number of iterations (L−2) being by 2 less than the number of set layers on the respective remaining sets of vertices with associated simplified connectivities to generate decomposed layers ($V_{L-1}, \ldots, V_2$) with associated connectivities ($K_{L-1}, \ldots, K_2$), and defining the remaining set of vertices ($V_1$) with associated connectivity ($K_1$)) as a base layer, wherein the determining a simplified connectivity associated to the remaining set of vertices includes triangulating the vertices of the former 1-ring neighborhood of a removed vertex, wherein the 1-ring neighborhood is defined by all vertices being a direct neighbour of a vertex, wherein a triangulation is selected based on an average absolute deviation of the valences of the vertices of the 1-ring neighborhood of the removed vertex from a valence equal to a predefined number, in particular equal to 6, with respect to the triangulation and the connectivity ($K_l$)) associated to the layer, determining a predictor according to the specified compression method, decoding a prediction error and calculating a prediction value and/or the location data of the corresponding vertex based on the specified predictor and the decoded prediction error whereby the determining the predictor according to the specified compression method, the decoding the prediction error and the calculating a prediction value are performed preferably in each layer, decoding the location data of the vertices of a base layer, wherein in case of an I-frame compression for a current vertex of a current frame comprises calculating an I-frame predictor as an average of the locations of an already decoded 1-ring neighbourhood of said current vertex in said current frame, wherein in case of a P-frame compression for a current vertex of a current frame, considering an already decoded frame as a reference frame and calculating a P-frame predictor by adding up an I-frame predictor of the current vertex of the current frame calculated as in case of an I-frame compression and a difference of the location of the current vertex in the reference frame and an I-frame predictor of the current vertex of the reference frame calculated as in case of an I-frame compression respectively, and said difference is multiplied by a Rotation Matrix (A), and wherein in case of a B-frame compression for a current vertex of a current frame, considering two already decoded frames as a first reference frame and second reference frame respectively, and calculating a B-frame predictor by calculating an average, in particular a weighted average, of a P-frame predictor as in case of a P-frame compression considering the first reference frame and a P-frame predictor as in case of a P-frame compression considering the second reference frame.

7. The method according to claim 6, wherein an information for specifying the chosen predictor is decoded frame-wise or layer-wise, in particular using a fixed number of bits.

8. The method according to claim 6, wherein the method is adapted to decode a data signal being coded by a method according to claim 1.

9. A decoding device for decoding a data signal representing an encoded time-consistent 3D mesh sequence adapted for carrying out the method of claim 6.

10. A non-transitory computer-readable storage medium, having computer-executable instructions stored thereon for encoding a time-consistent 3D mesh sequence, that when executed by at least one processor, cause the at least one processor to:

receive successive frames of a 3D mesh sequence, wherein a frame comprises a set of vertices (V) with associated connectivity (K) and wherein the connectivity (K) is identical for all frames of the 3D mesh sequence, decompose the 3D mesh sequence into a multi-resolution representation comprising two or more spatial layers represented by disjoint sets of vertices ($V_l$) with associated connectivities ($K_l$), wherein the decomposing the 3D mesh sequence into a multi-resolution representation includes:

setting a number of layers (L) for decomposition, encoding the set number of layers (L) for the decomposition, selecting one or more patches comprising sets of triangles having one middle vertex in common, the middle vertex having a valence not more than a predefined number, in particular not more than 6, the valence being defined by the number of direct neighbour vertices of said middle vertex, removing the middle vertices of said one or more selected patches and generating a decomposed layer ($V_L$) defined by said removed middle vertices with associated connectivity ($K_L$), determining a simplified connectivity associated to the remaining set of vertices, wherein the determining the simplified connectivity associated to the remaining set of vertices includes triangulating the vertices of the former 1-ring neighborhood of a removed vertex, wherein the 1-ring neighborhood is defined by all vertices being a direct neighbor of a vertex, wherein a triangulation is selected based on an average absolute deviation of the valences of the vertices of the 1-ring neighborhood of the removed vertex from a valence equal to a predefined number, in particular equal to 6, with respect to the triangulation and the connectivity ($K_l$) associated to the layer, repeating the selecting one or more patches the removing the middle vertices, and the determining a simplified connectivity for a number of iterations (L−2) being by 2 less than the number of set layers on the respective remaining sets of vertices with associated simplified connectivities to generate decomposed layers ($V_{L-1}, \ldots, V_2$) with associated connectivities ($K_{L-1}, \ldots, K_2$), and defining the remaining set of vertices ($V_1$) with associated connectivity ($K_1$) as a base layer, and encode the vertices of the layers using a predictive encoder, wherein the decomposition is calculated from the connectivity (K) of the 3D mesh sequence irrespectively of location data of the vertices, and wherein the encoding the vertices of the layers using a predictive encoder includes:

selecting a compression method for each frame being selected of the group comprising of: an I-frame compression and a P-frame compression and/or a B-frame compression, and generating a prediction error using an I-frame predictor, a P-frame predictor, or a B-frame predictor respectively, wherein the P-frame compression includes, for a current vertex of a current frame, considering an already encoded frame as a reference frame, calculating a P-frame predictor by adding up an I-frame predictor of the current vertex of the current frame and a difference of the location of the current vertex in the reference frame and an I-frame predictor of the current vertex of the reference from respectively, whereby said difference is multiplied by a Rotation Matrix (A).

11. A non-transitory computer-readable storage medium, having computer-executable instructions stored thereon for decoding a data signal representing an encoded time-consistent 3D mesh sequence, that when executed by at least one processor, cause the at least one processor to:

decode signal representing an encoded time-consistent 3D mesh sequence defined by frames, each frame comprises a set of vertices (V) with associated connectivity (K) wherein the connectivity (K) is identical for all frames of the 3D mesh sequence, and encoded by using scalable predictive coding, wherein the decoding the data signal includes:

receiving the data signal, decoding the connectivity (K) of the 3D mesh sequence, decomposing the 3D mesh sequence into a multi-resolution representation comprising two or more spatial layers represented by disjoint sets of vertices ($V_j$) with associated connectivities ($K_j$), decoding the vertices of the layers using a predictive decoder, wherein the decomposition is calculated from the connectivity (K) of the 3D mesh sequence irrespectively of location data of the vertices, decoding for each frame and/or for each layer information specifying a compression method as used by the coder, in particular decoding reference frame numbers representing the numbers of reference frames and decoding the type of compression method comprising I-frame compression and P-frame compression and/or B-frame compression, wherein decomposing the 3D mesh sequence into a multi-resolution representation includes:

decoding a layer number representing the number of layers (L) as received from a coder, selecting one or more patches comprising sets of triangles having one middle vertex in common, the middle vertex having a valence not more than a predefined number, in particular not more than 6 the valence being defined by the number of direct neighbour vertices of said middle vertex, removing the middle vertices of said one or more selected patches and generating a decomposed layer ($V_L$) defined by said removed middle vertices with associated connectivity ($K_L$), determining a simplified connectivity associated to the remaining set of vertices, repeating the selecting one or more patches, the removing the middle vertices, and the determining a simplified connectivity for a number of iterations (L−2) being by 2 less than the number of set layers on the respective remaining sets of vertices with associated simplified connectivities to generate decomposed layers ($V_{L-1}, \ldots, V_2$) with associated connectivities ($K_{L-1}, \ldots, K_2$), and defining the remaining set of vertices ($V_1$) with associated connectivity ($K_1$) as a base layer, wherein the determining a simplified connectivity associated to the remaining set of vertices includes triangulating the vertices of the former 1-ring neighborhood of a removed vertex, wherein the 1-ring neighborhood is defined by all vertices being a direct neighbour of a vertex, wherein a triangulation is selected based on an average absolute deviation of the valences of the vertices of the 1-ring neighborhood of the removed vertex from a valence equal to a predefined number, in particular equal to 6, with respect to the triangulation and the connectivity ($K_j$) associated to the layer, determining a predictor according to the specified compression method, decoding a prediction error and calculating a prediction value and/or the location data of the corresponding vertex based on the specified predictor and the decoded prediction error whereby the determining the predictor, the decoding the prediction error and the calculating the prediction value are performed preferably in each layer, decoding the location data of the vertices of a base layer wherein in case of an I-frame compression for a current vertex of a current frame comprises calculating an I-frame predictor as an average of the locations of an already decoded 1-ring neighbourhood of said current vertex in said current frame, wherein in case of a P-frame compression for a current vertex of a current frame, considering an already decoded frame as a reference frame and calculating a P-frame predictor by adding up an I-frame predictor of the current vertex of the current frame calculated as in case of an I-frame compression and the difference of the location of the current vertex in the reference frame and an I-frame predictor of the current vertex of the reference frame calculated as in case of an I-frame compression respectively, and said difference is multiplied by a Rotation Matrix (A), and wherein in case of a B-frame compression for a current vertex of a current frame, considering tv/oulroudy decoded frames as a first reference frame and second reference frame respectively, and calculating a B-frame predictor by calculating an average, in particular a weighted average, of a P-frame predictor as in case of a P-frame compression considering the first reference frame and a P-frame predictor as in case of a P-frame compression considering the second reference frame.

* * * * *